US010189421B2

(12) United States Patent
Matori

(10) Patent No.: US 10,189,421 B2
(45) Date of Patent: Jan. 29, 2019

(54) CAMERA UNIT, VEHICLE, AND METHOD FOR MANUFACTURING CAMERA UNIT

(71) Applicant: HONDA MOTOR CO., LTD., Minato-Ku, Tokyo (JP)

(72) Inventor: Tadahiro Matori, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 14/773,664

(22) PCT Filed: Mar. 11, 2013

(86) PCT No.: PCT/JP2013/056567
§ 371 (c)(1),
(2) Date: Sep. 8, 2015

(87) PCT Pub. No.: WO2014/141357
PCT Pub. Date: Sep. 18, 2014

(65) Prior Publication Data

US 2016/0023620 A1 Jan. 28, 2016

(51) Int. Cl.
*H04N 5/225* (2006.01)
*B60R 11/04* (2006.01)
(Continued)

(52) U.S. Cl.
CPC ............ *B60R 11/04* (2013.01); *G03B 11/045* (2013.01); *G03B 17/02* (2013.01); *H04N 5/2252* (2013.01);
(Continued)

(58) Field of Classification Search
CPC ...................................................... B60R 11/04
See application file for complete search history.

(56) References Cited

U.S. PATENT DOCUMENTS

2004/0032668 A1 2/2004 Schaefer et al.
2007/0041725 A1 2/2007 Neumann et al.
(Continued)

FOREIGN PATENT DOCUMENTS

CN 102809795 A 12/2012
CN 202720694 U 2/2013
(Continued)

OTHER PUBLICATIONS

Office Action dated Jun. 28, 2016 issued over the corresponding Japanese Patent Application 2015-505100 with the English translation of pertinent portion.
(Continued)

*Primary Examiner* — Jonathan R Messmore
(74) *Attorney, Agent, or Firm* — Carrier Blackman & Associates, P.C.; Joseph P. Carrier; Jingli Wang

(57) ABSTRACT

Provided is a camera unit, a vehicle, and a method for manufacturing the camera unit. The first wall part of a housing for the camera unit extends parallel to an optical axis or in a slanted manner so as to gradually draw away from the optical axis in the direction from a lens toward a subject. A plurality of projections is disposed on the first wall part in alignment with the optical axis direction. The plurality of projections each have a first surface made up of a flat or curved surface in which the lens side is nearer to the optical axis than the subject side, and a second surface made up of a flat or curved surface in which the lens side is further away from the optical axis than the subject side, or made up of a flat surface parallel to the optical axis.

7 Claims, 23 Drawing Sheets

(51) Int. Cl.
*G03B 17/02* (2006.01)
*G03B 11/04* (2006.01)
*B60R 11/00* (2006.01)

(52) U.S. Cl.
CPC .... *H04N 5/2254* (2013.01); *B60R 2011/0026* (2013.01)

(56) References Cited

U.S. PATENT DOCUMENTS

| | | | | |
|---|---|---|---|---|
| 2012/0207461 | A1 | 8/2012 | Okuda | |
| 2013/0010377 | A1 | 1/2013 | Okuyama et al. | |
| 2014/0060582 | A1* | 3/2014 | Hartranft | B05B 1/06 134/18 |
| 2014/0160284 | A1 | 6/2014 | Achenbach et al. | |
| 2014/0300738 | A1 | 10/2014 | Mueller | |
| 2015/0015713 | A1* | 1/2015 | Wang | H04N 5/235 348/148 |

FOREIGN PATENT DOCUMENTS

| | | | |
|---|---|---|---|
| EP | 2 246 219 | A1 | 11/2010 |
| JP | 34-018161 | | 11/1959 |
| JP | 2003-285687 | A | 10/2003 |
| JP | 2004-343379 | A | 12/2004 |
| JP | 2008-500926 | A | 1/2008 |
| JP | 2012-166615 | A | 9/2012 |
| JP | 2012-226317 | A | 11/2012 |
| KR | 20110001709 | A | 1/2011 |
| WO | 2012163341 | A1 | 12/2012 |
| WO | 2013019795 | A1 | 2/2013 |

OTHER PUBLICATIONS

Office Action and Search Report dated Apr. 26, 2017, issued over the corresponding Chinese Patent Application 201380074471.0, with the machine English translation of the Office Action and English translation of the of the pertinent portion of the Search Report.

Office Action dated Dec. 1, 2015 issued over the corresponding Japanese National-Phase Application No. 2015-505100 with the English translation of pertinent portion.

* cited by examiner 10
16
18
12
20
14
X1
X2
Z1
Z2

Z1
Y2
X1
Z2
X2
Y1
22
36
112
24
116
32
110
118
120
12
20
18
34
26
92
94
90
30

X1
X2
Y1
Y2
Z1
Z2
12
18
20
22
24
26
30
32
34
36
40
42
44
50
54
56
58
60
62
64
90
92
94
120

18
Y1
X1
Z2
Z1
X2
Y2
36
28
94
92
90
32

18
X2
Y1
Y2
X1
22
30
32
26
28
110
136
134
130
132
24
34
36
116
114
112

18
22
24
26
28
30
32
34
36
110
112
114
116
120(118)
136
VIII
VIII
X2, Z1
X1, Z2
Y1
Y2

12
102
100
120
110
18
118
112
θa
L1
136
134
130
132
Ax
24
L2
92
94
90

12
102
100
120
110
18
118
Lout
θ out
200C
θ in
θ a
L1
Lin
140
Ax
24
L2
92
94
90

12
102
100
120
110
18
118
Lout
θout
Lout
112
θin
Lout
θa
L1
136
134
130
132
Lin
140
Ax
24
L2
92
94
90

140
Lin
θin
Lout
θout
130
132
134
112
92

18b
X2
Y1
Y2
X1
22
30
32
26
28
110
136
24
134
130
132
34
36
116
114
112

18d
22
24
26
28
30
32
34
36
110
112
114
116
120(118)
136
X2, Z1
X1, Z2
Y1
Y2

18e
32
28
36
22
110
24
116
136
120 (118)
112
114
30
26
34
X2, Z1
Y2
Y1
X1, Z2

12
102
100
120
110
18f
118
112
θa
L1
136
134
130
132
Ax
24
L2
92
94
90

12
102
100
120
110
118
Lv
112
18g
θa
L1
136
134
130
132
Ax
24
L2
92
94
90

12
102
100
120
110
18h
118
112
θa
L1
136
134
130
132
Ax
24
L2
92
94
90

12
102
100
120
110
18
118
112
150
θa
L1
136
134
130
132
Ax
24
L2
92
94
90

12
102
100
120
110
18J
118
112
θa
L1
136
134
130
132
Ax
24
L2
92
94
90

12
102
100
120
110
18k
118
112
θa
L1
136
134
130
132
Ax
24
L2
92
94
90

12
102
100
120
110
18
118
θa
112
L1
136
134
130
132
Ax
24
L2
92
94
90

CAMERA UNIT, VEHICLE, AND METHOD FOR MANUFACTURING CAMERA UNIT

TECHNICAL FIELD

The present invention relates to a camera unit having a camera casing, and a lens and an image capturing element that are disposed in the interior of the camera casing, a vehicle in which the camera unit is provided, and a method for manufacturing the camera unit.

BACKGROUND ART

In FIGS. 3(a) and 3(b) of Japanese Laid-Open Patent Publication No. 2003-285687 (hereinafter referred to as "JP2003-285687A"), a vehicle exterior monitoring camera and the arrangement of such a camera are disclosed as conventional technologies (refer to paragraphs [0002] and [0003]). In FIG. 3(c) of JP2003-285687A, a vehicle interior monitoring camera and the arrangement of such a camera are disclosed as conventional technologies (refer to paragraph [0004]). Furthermore, in FIGS. 1(a), 1(b), 2(a), and 2(b) of JP2003-285687A, a vehicle interior and exterior monitoring omnidirectional camera 1, which is disposed in the interior of a camera case 3 that is fixed in a suspended condition inside the vehicle on a front windshield 4 of the vehicle, and the arrangement of such a camera are disclosed (refer to paragraphs [0016], [0029], and [0037]).

SUMMARY OF INVENTION

As described above, although multiple types of vehicle mounted cameras and arrangements therefor have been disclosed in JP2003-285687A, from various standpoints, there is still room for improvement in relation to the structure and the like of such vehicle mounted cameras. For example, in any of the vehicle mounted cameras disclosed in JP2003-285687A, the lens is positioned in the vicinity of a distal end on a subject side of the camera casing. Therefore, it is relatively easy for such cameras to be influenced by vehicle vibrations, and depending on the circumstances, there is a possibility for problems to occur in relation to limitations on design. Moreover, such problems may be considered as applicable to cameras in general, and are not restricted to vehicle mounted cameras only.

The present invention has been devised taking into consideration the aforementioned problems, and has the object of providing a camera unit, a vehicle, and a method of manufacturing a camera unit, which enables a new lens arrangement for realizing a structure that solves the problems of the conventional camera having the lens thereof arranged in the camera casing in the vicinity of a distal end on the subject side.

The camera unit according to the present invention includes a camera casing, a lens, and an image capturing element that is disposed in interior of the camera casing, wherein a recess is formed in the camera casing on a side that is closer to a subject than the lens, a portion or all of the recess is formed by a first wall portion, which is exposed on an exterior side of the camera casing and faces toward an optical axis, the first wall portion extends in parallel with the optical axis or is inclined so as to separate away from the optical axis as is away from the lens toward the subject, and a plurality of projections are arranged on the first wall portion alongside one another in a direction of the optical axis. The plural projections include first surfaces, which are made up from flat or curved surfaces, sides of the first surfaces facing toward the lens being closer to the optical axis than sides of the first surfaces facing toward the subject, and second surfaces, which are made up from flat or curved surfaces, sides of the second surfaces facing toward the lens being farther from the optical axis than sides of the second surfaces facing toward the subject, or which are made up from flat surfaces that are parallel with the optical axis.

According to the present invention, in a structure that has a portion of the camera casing being arranged more toward the side of the subject than the lens (or stated otherwise, a structure in which the lens is arranged remotely from the vicinity of a distal end on the subject side of the camera casing), reflected light (including scattered light) made up from external light such as sunlight or the like can be prevented from entering the lens and the image capturing element.

Sunlight at a time that the sun is positioned obliquely above the camera unit, for example, is external light, and a case can be considered in which the first wall portion is inclined downwardly in a direction from the lens toward the subject. Since the first surfaces are flat or curved surfaces, the lens sides of which are closer to the optical axis than the subject sides thereof, compared to the inclination of the first wall portion as a whole, the first surfaces are nearer to being perpendicular with respect to the optical axis Ax. Therefore, it becomes difficult for reflected sunlight that is incident on the first surfaces, including scattered light, to enter the lens and the image capturing element. The same situation applies also to a case in which the first wall portion extends parallel to the optical axis.

Consequently, it is possible to achieve various features that would otherwise be difficult to realize with a structure in which the lens is arranged in the vicinity of a distal end on the subject side of the camera casing.

When the adjacent first surfaces and the second surfaces are compared alongside one another, the first surfaces may be longer than the second surfaces in the direction of the optical axis. Premised on the fact that the first wall portion is inclined so as to separate away from the optical axis in a direction from the lens toward the subject, or extends in parallel with the optical axis, if the first surfaces are made longer than the adjacent second surfaces in the direction of the optical axis, the first surfaces are wider in area than the second surfaces. In this case, it is easier for external light to impinge on the first surfaces than the second surfaces, and as a result, it can be made more difficult for reflected light from the first wall portion as a whole to enter the lens and the image capturing element.

In the case that the second surfaces are flat surfaces, the lens sides of which are farther from the optical axis than the subject sides thereof, then a line, which is drawn perpendicularly toward a side of the lens at a position closest to the optical axis side of each of the second surfaces, may intersect the adjacent first surface on the lens side thereof with respect to the second surface. In accordance therewith, the majority of the reflected light from the external light that is incident on the second surfaces is made incident on the first surfaces, and as a result, entry of such reflected light into the lens and the image capturing element can be avoided.

The projections can be of the same shape or of different shapes mutually. Further, three, four, or five or more of such projections may be arranged in the direction of the optical axis.

The camera casing may include a second wall portion, which is positioned closer to the image capturing element than the first wall portion at a location between the subject and the lens, and which is formed with an opening therein through which the optical axis passes, and the opening may be closed by a transparent member that differs from the lens. Consequently, with a structure in which the lens is arranged in the interior of the camera casing without being exposed from the camera casing, dust can be prevented from entering into the camera casing through the opening.

The camera casing may include a bracket configured to fix the camera casing to an attachment object, and to support the camera casing in a detachable manner. In this case, the camera may further include a first connector for connection to the bracket, and which is arranged on a side closer to the image capturing element than the lens, and a second connector for connection to the bracket, and which is arranged on a side closer to the subject than the lens. Consequently, since the camera casing is fixed to the bracket both in front of and behind the lens, the camera casing can be fixed in a relatively secure manner to the bracket, along with preventing entry of external light into the lens and the image capturing element.

A vehicle according to the present invention is characterized by having the camera unit disposed on a front windshield of the vehicle, such that the camera unit captures an image in front of the vehicle. By this feature, a camera unit can be realized in which it is difficult for sunlight to enter the lens and the image capturing element.

A method for producing the camera unit according to the present invention is characterized by a step of setting angles of the first surfaces and the second surfaces to be equal to or greater than a draft angle. By this feature, in the case that a mold is used when the camera casing is fabricated, a slide mold for handling an undercut is rendered unnecessary, thereby enabling a reduction in cost.

DESCRIPTION OF EMBODIMENTS

A. Embodiment

1. Description of Overall Configuration

1-1. Condition of Use

Figure 1:
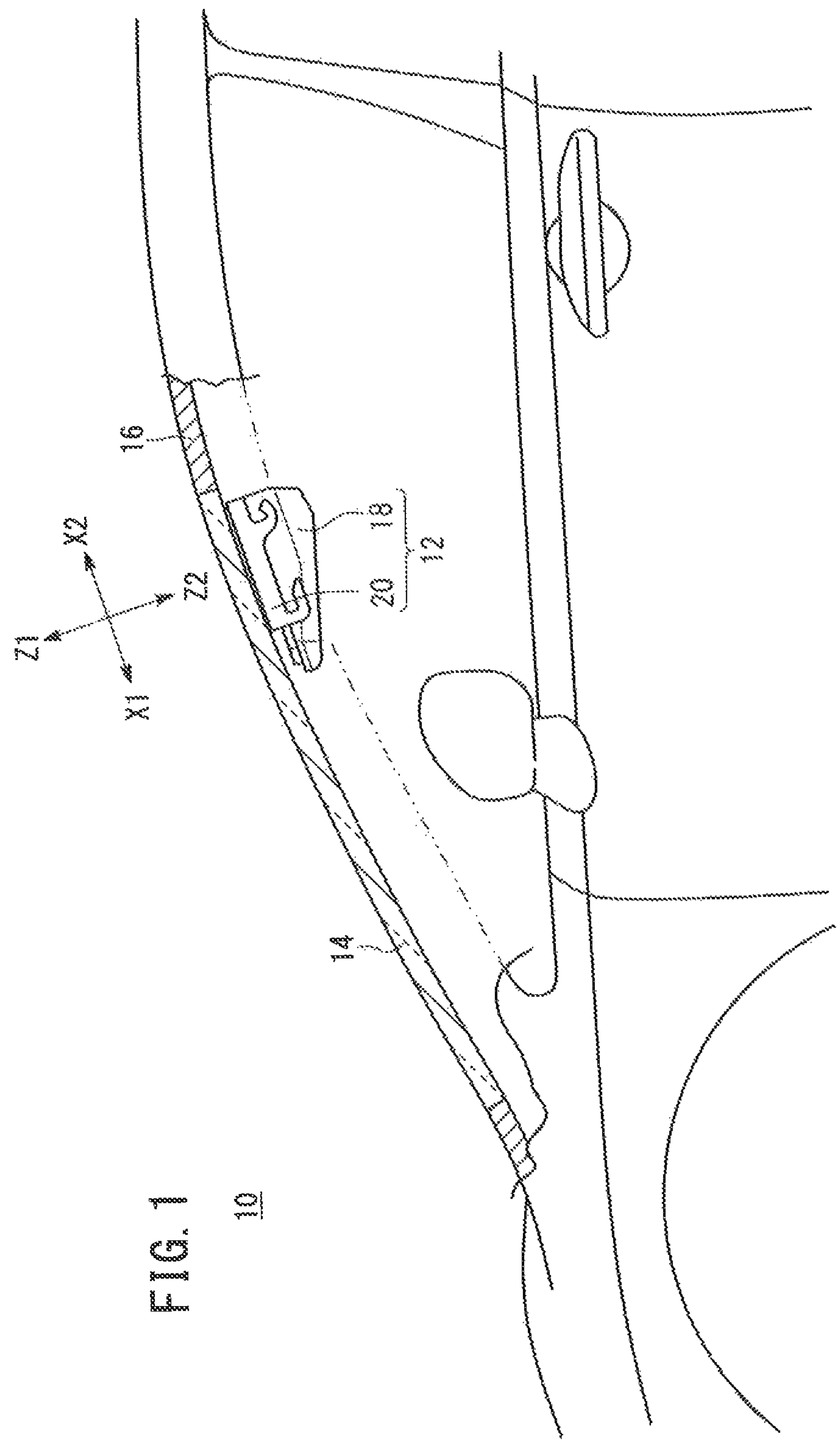
FIG. 1 is a side view showing in a simplified manner an attached condition of a camera unit according to an embodiment of the present invention.

FIG. 1 is a side view showing in a simplified manner an attached condition of a camera unit 12 according to an embodiment of the present invention. As shown in FIG. 1, the camera unit 12 is attached to a front windshield 14 (attachment object) of a vehicle 10. Alternatively, the camera unit 12 may be attached to the roof 16. Further, the camera unit 12 is fixed to one side of a non-illustrated room mirror.

The camera unit 12 of the present embodiment can be used, for example, to measure the distance to a preceding vehicle, or for detecting a road lane in order to prevent the vehicle 10 from protruding from the lane (to be described in greater detail later).

1-2. Overall Configuration

Figure 2:
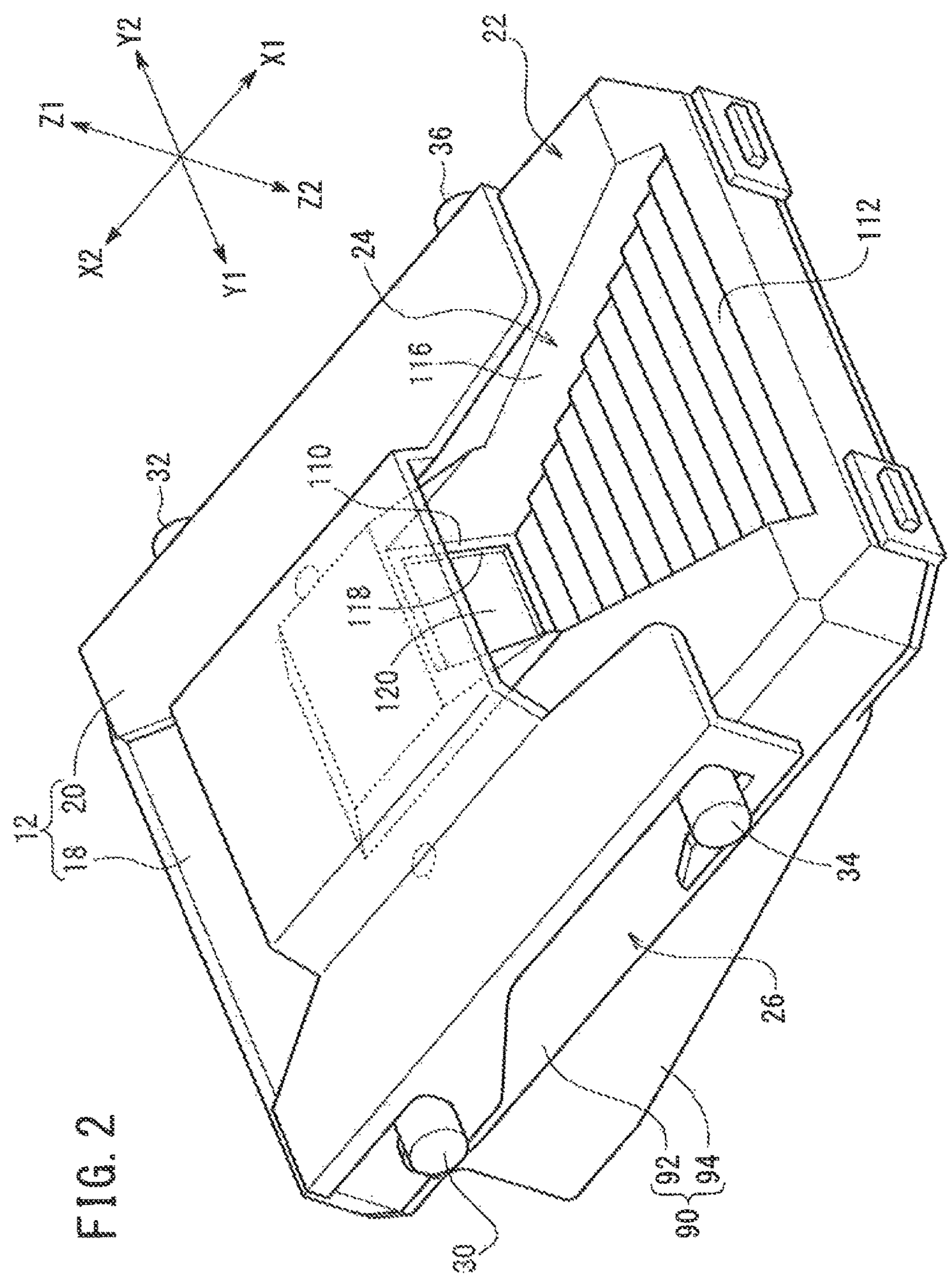
FIG. 2 is a perspective view showing a front surface, a right side surface, and a top surface of the camera unit.
Figure 3:
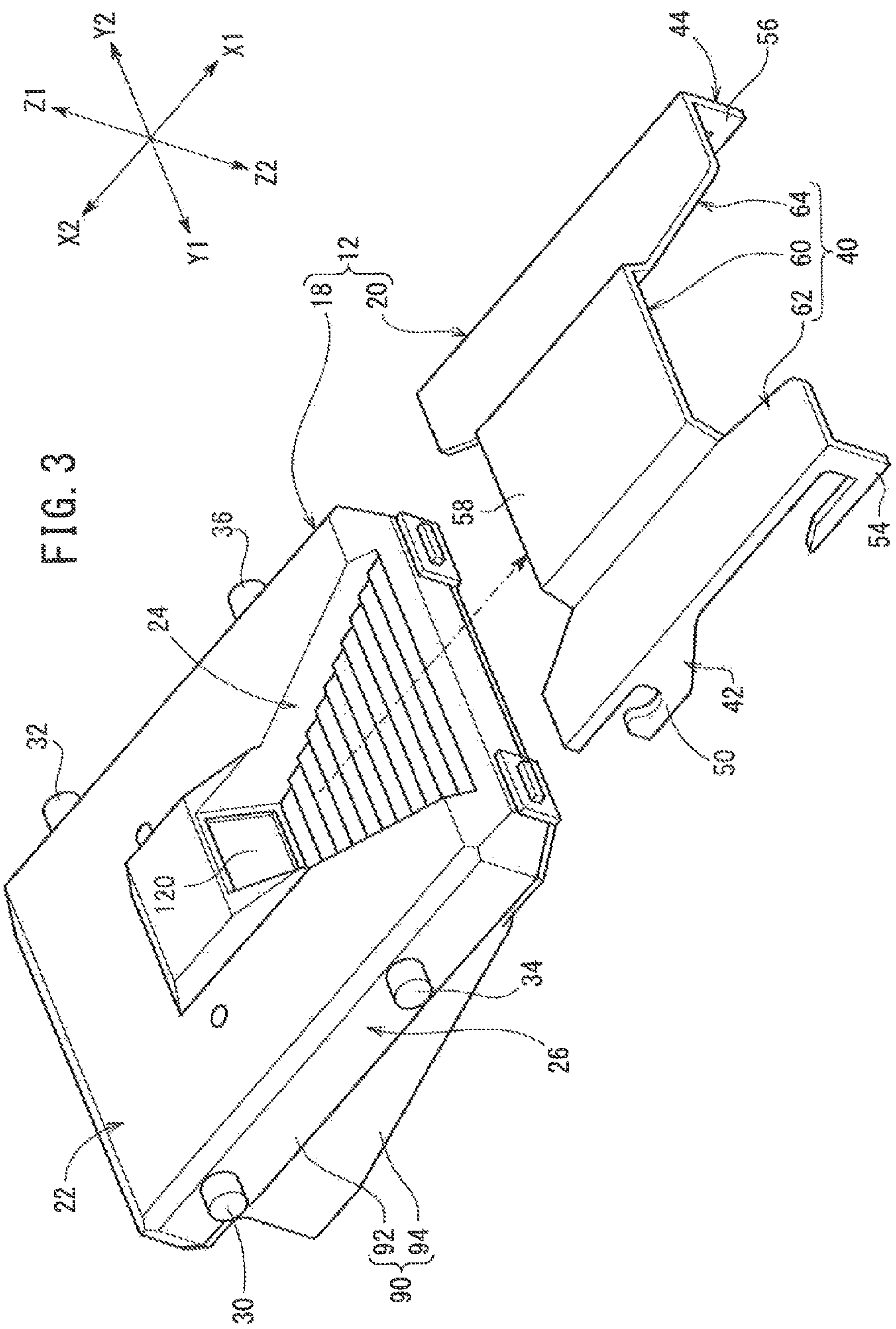
FIG. 3 is a view showing a manner of attaching a camera body of the camera unit to a bracket.
Figure 4:
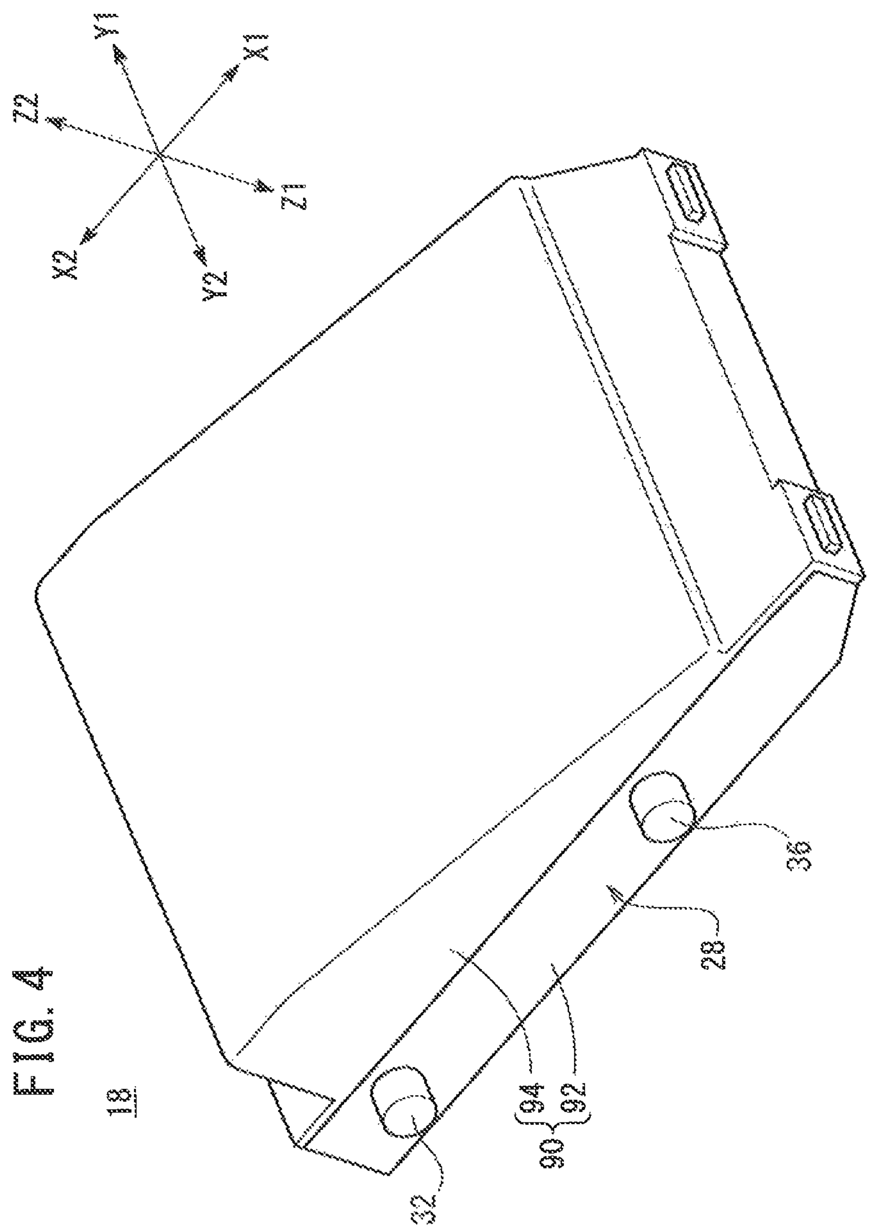
FIG. 4 is a perspective view showing a front surface, a left side surface, and a bottom surface of the camera body.
Figure 5:
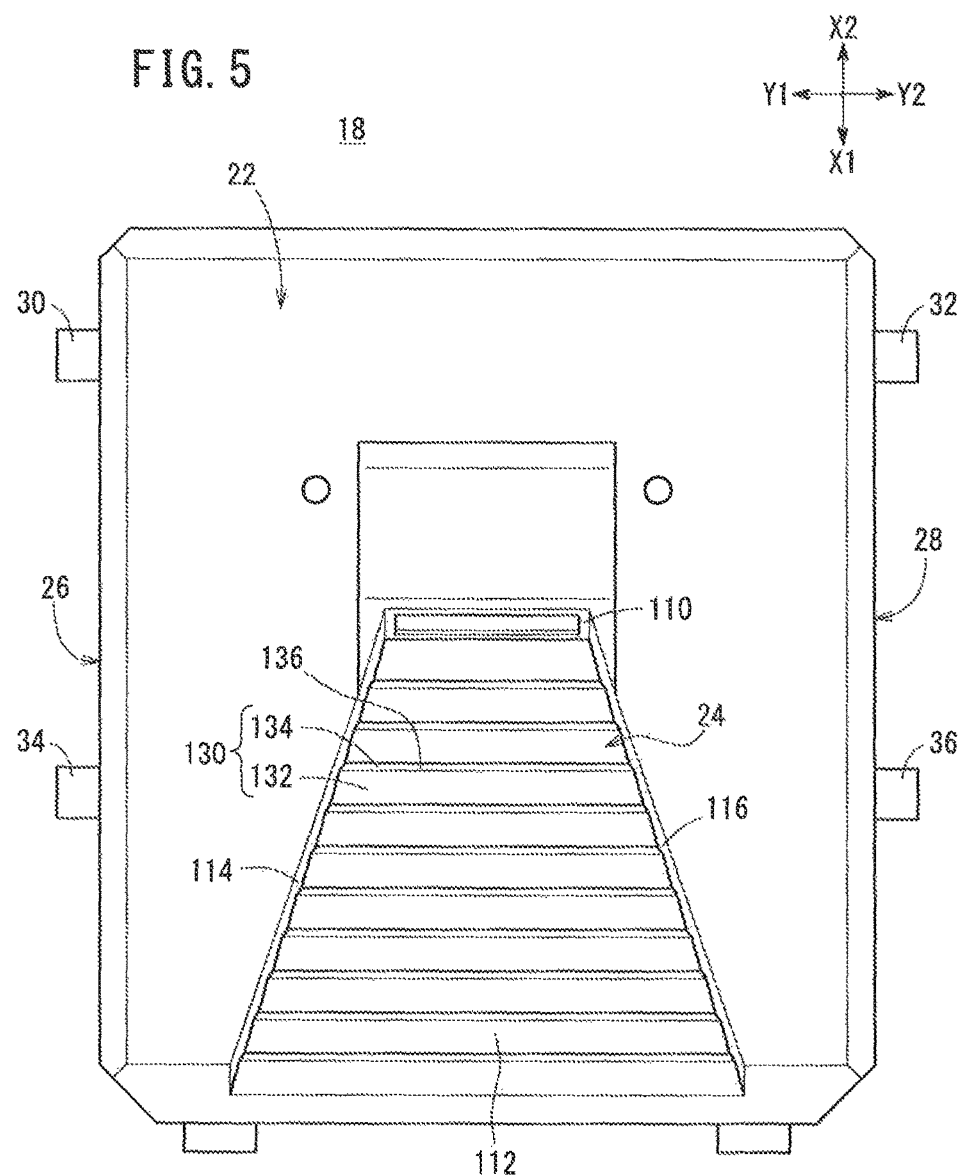
FIG. 5 is a plan view of the camera body.
Figure 6:
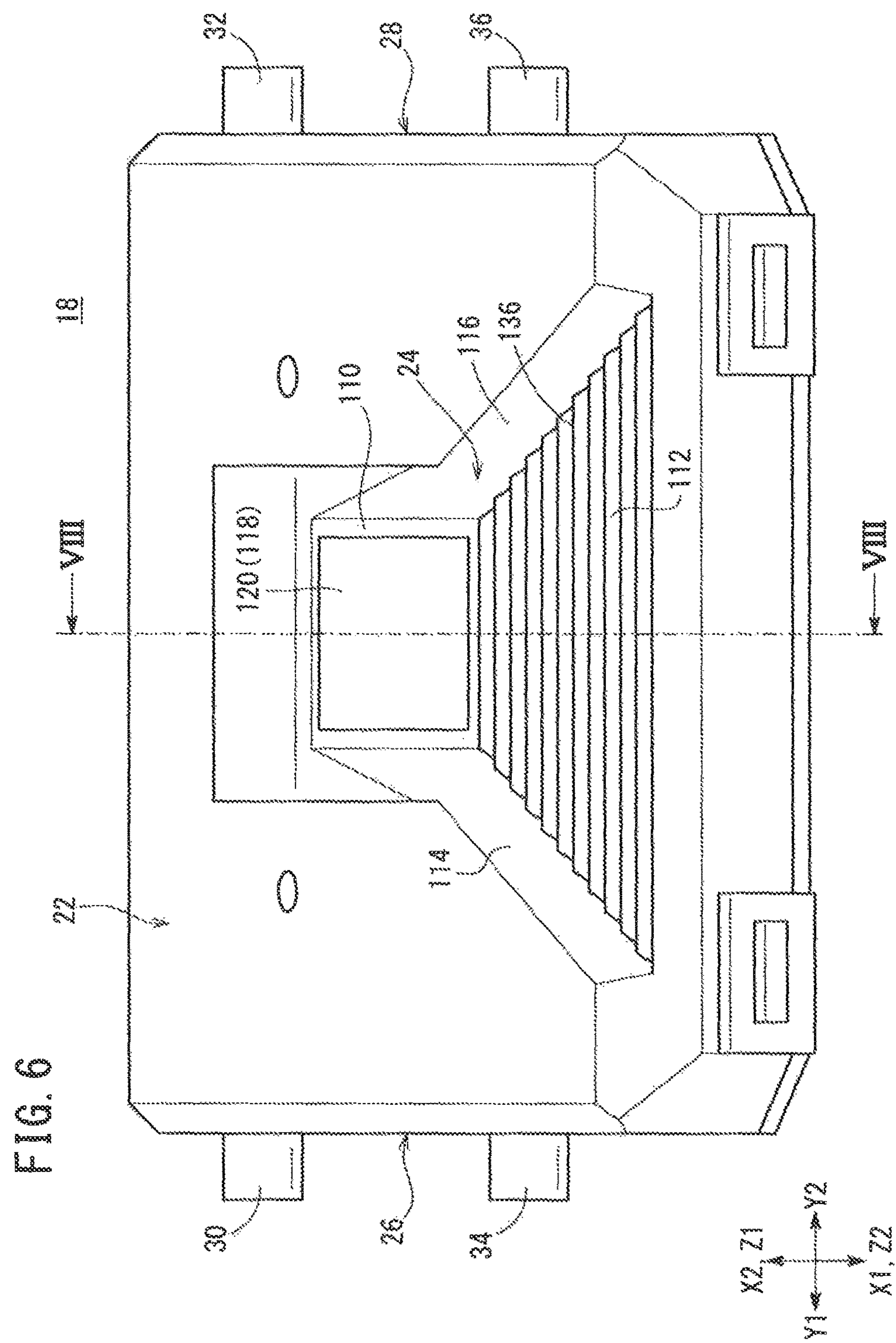
FIG. 6 is a perspective view showing a front surface and a top surface of the camera body.

FIG. 2 is a perspective view showing a front surface, a right side surface, and a top surface (as viewed from X2, Y2, and Z2 directions) of the camera unit 12. FIG. 3 is a view showing a manner of attaching a camera body 18 of the camera unit 12 to a bracket 20. FIG. 4 is a perspective view showing a front surface, a left side surface, and a bottom surface (as viewed from X2, Y1, and Z1 directions) of the camera body 18. FIG. 5 is a plan view (in the Z2 direction) of the camera body 18. FIG. 6 is a perspective view showing a front surface and a top surface (as viewed from X2 and Z2 directions) of the camera body 18.

Figure 7:
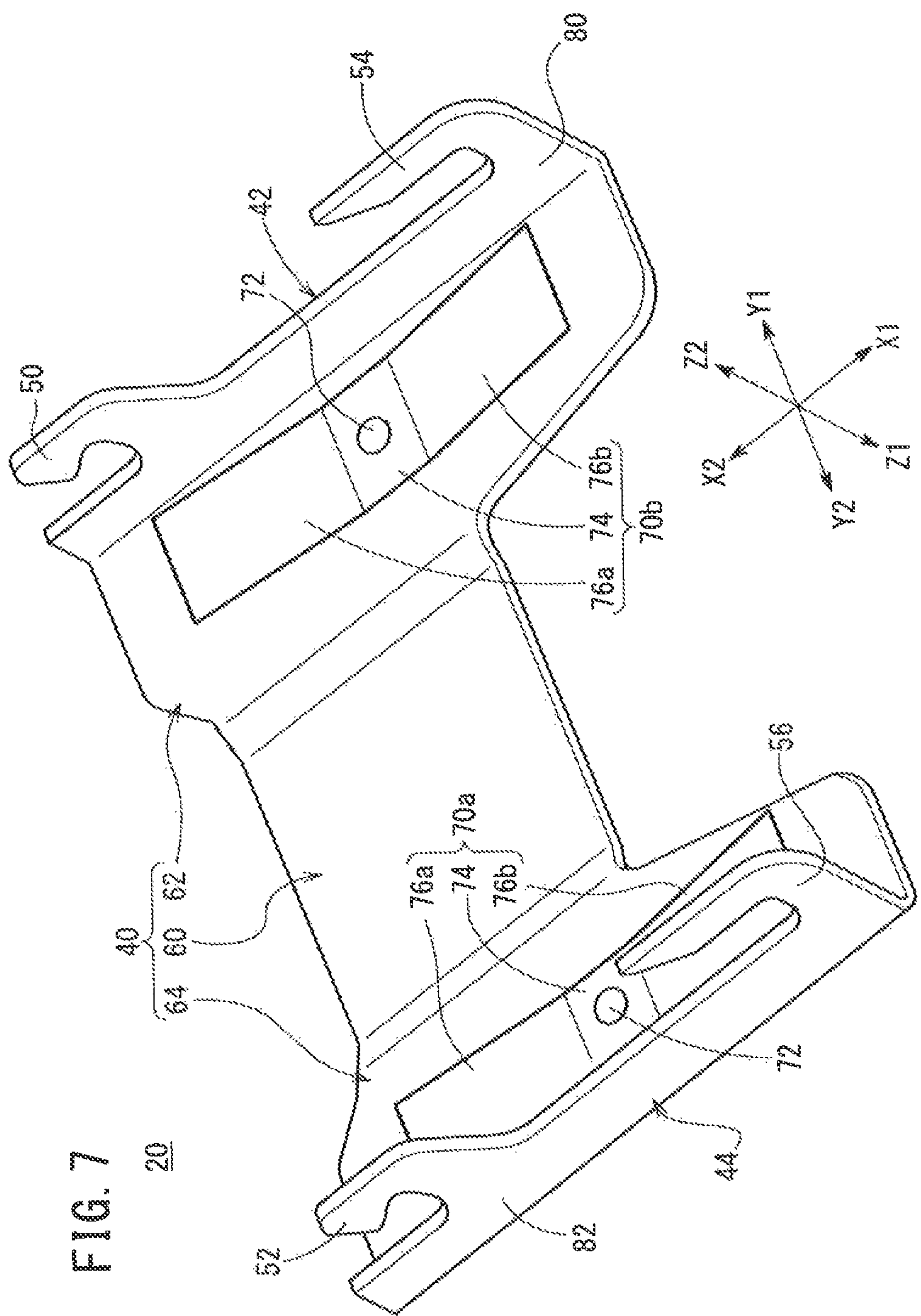
FIG. 7 is a perspective view showing a front surface, a left side surface, and a bottom surface of the bracket.
Figure 8:
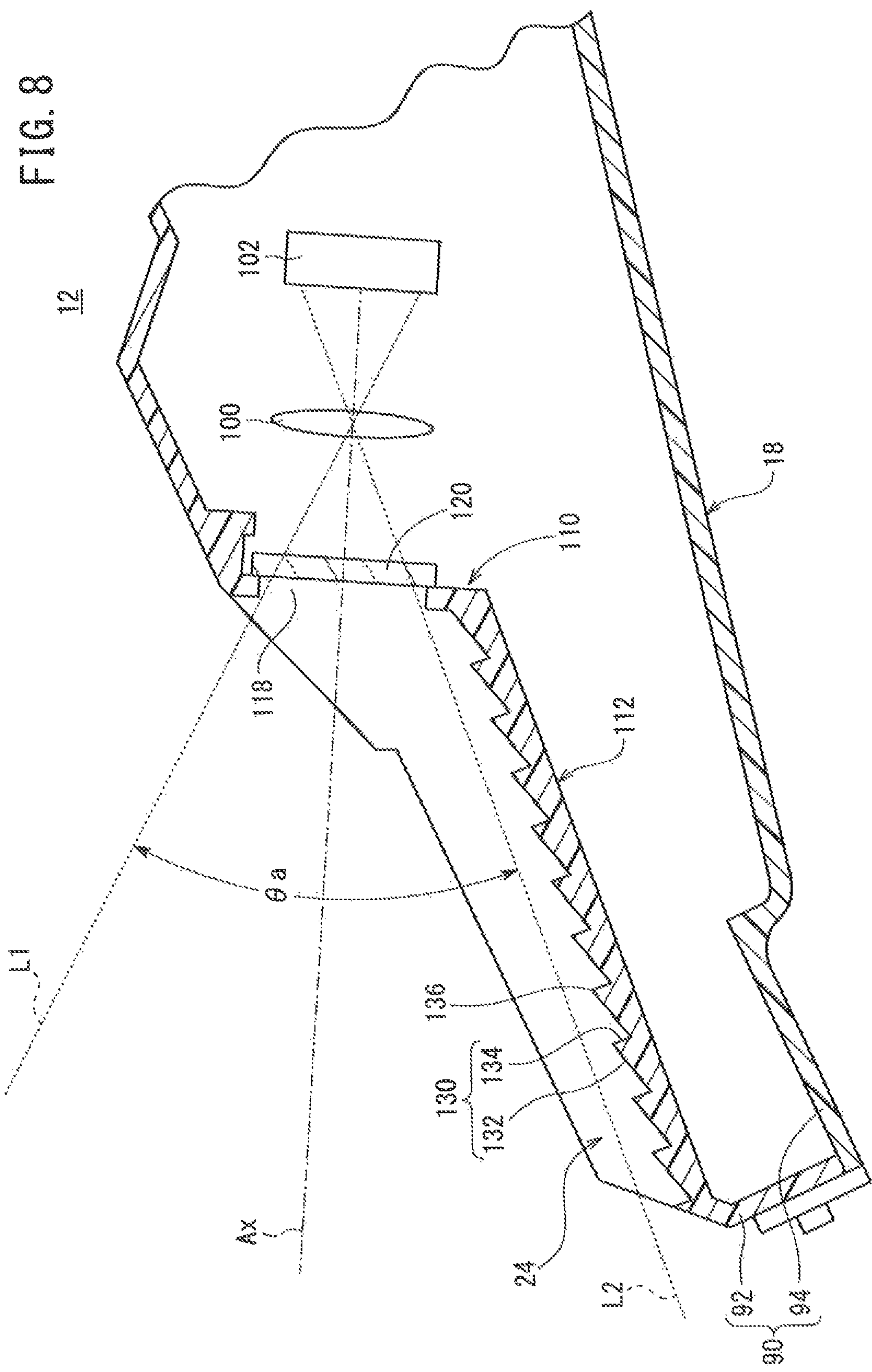
FIG. 8 is a partially enlarged cross-sectional view showing in an enlarged form a partial cross section taken along line VIII-VIII of FIG. 6 while omitting parts in the interior of the camera body.

FIG. 7 is a perspective view of the bracket 20 showing a front surface, a left side surface, and a bottom surface (as viewed from X2, Y1, and Z1 directions) of the bracket 20. FIG. 8 is a partially enlarged cross-sectional view showing in an enlarged form a partial cross section taken along line VIII-VIII of FIG. 6 (in the Y1 direction) while omitting parts in the interior of the camera body 18.

As shown in FIGS. 1 through 3, the camera unit 12 includes the camera body 18 and the bracket 20. The bracket 20 detachably supports the camera body 18 and fixes the camera body 18 to (the front windshield 14 of) the vehicle 10.

The camera body 18 is basically in the form of a rectangular parallelepiped (see FIG. 1) which becomes thinner in a forward direction (the X1 direction in FIGS. 1 and 2, etc.). A recess 24 for ensuring a visual field range of the camera body 18 is formed on an upper surface 22 thereof. Further, a first projection 30 and a third projection 34 are formed on a right side surface 26 of the camera body 18, whereas a second projection 32 and a fourth projection 36 are formed on a left side surface 28 of the camera body 18.

As shown in FIGS. 3 and 7, the bracket 20 is made up from a central base part 40 on an upper side (in the Z1 direction), a right side surface 42 on a right side (in the Y1 direction), and a left side surface 44 on a left side (in the Y2 direction) thereof. A first hook portion 50 and a third hook portion 54 are formed in the right side surface 42, whereas a second hook portion 52 and a fourth hook portion 56 are formed in the left side surface 44.

As shown in FIGS. 2, 3, and the like, the camera body 18 is inserted into an inner side of the bracket 20, and the camera body 18 is fixed in the bracket 20 by engagement of the first through fourth projections 30, 32, 34, 36 of the camera body 18 with the first through fourth hook portions 50, 52, 54, 56 of the bracket 20.

1-3. Bracket 20

As noted above, the bracket 20 includes the central base part 40 on the upper side, the right side surface 42 that projects from a right end of the central base part 40, and the left side surface 44 that projects from a left end of the central base part 40. The bracket 20 is manufactured by press working a metal such as iron or the like, for example. An outside surface 58 of the central base part 40 is used as an attachment surface for attachment to (the front windshield 14 of) the vehicle 10 (see FIG. 1).

(1-3-1. Central Base Part 40)

The central base part 40 includes a center section 60 positioned in the center in the lateral direction (Y1 and Y2 directions) within the central base part 40, a right side section 62 positioned on the right side of the center section 60, and a left side section 64 positioned on the left side of the center section 60. The right side section 62 and the left side section 64 are shaped with line symmetry about the center section 60, and are longer in a longitudinal direction (the X1 and X2 directions) than the center section 60 (in particular, in the forward direction). The length of the center section 60 is kept short in order to ensure a visual field area for the camera body 18.

As shown in FIG. 7, plate springs 70*a*, 70*b* are fixed through rivets 72, respectively, to each of the right side section 62 and the left side section 64. The plate springs 70*a*, 70*b* serve to urge the camera body 18 in a downward direction (the Z2 direction). Consequently, the first through fourth projections 30, 32, 34, 36 of the camera body 18 and the first through fourth hook portions 50, 52, 54, 56 can be held strongly in contact with each other. Thus, shaking or rattling (backlash) of the camera body 18 can be prevented.

The plate springs 70*a*, 70*b* extend in the longitudinal direction (the X1 and X2 directions), and the center parts 74 of the plate springs 70*a*, 70*b* are fixed to the right side section 62 and the left side section 64 of the camera body 18. Opposite ends 76*a*, 76*b* of the plate springs 70*a*, 70*b* are spaced a certain distance from the right side section 62 and the left side section 64.

(1-3-2. Right Side Surface 42 and Left Side Surface 44)

As shown in FIG. 3, etc., the right side surface 42 of the bracket 20 includes a right base section 80 in addition to the first hook portion 50 and the third hook portion 54. The right base section 80 is arranged between the central base part 40 and the first hook portion 50 and the third hook portion 54. Stated otherwise, the first hook portion 50 and the third hook portion 54 of the present embodiment project out directly from the right base section 80.

Similarly, the left side surface 44 includes a left base section 82 in addition to the second hook portion 52 and the fourth hook portion 56. The left base section 82 is arranged between the central base part 40 and the second hook portion 52 and the fourth hook portion 56. Stated otherwise, the second hook portion 52 and the fourth hook portion 56 of the present embodiment project out directly from the left base section 82.

As shown in FIG. 7, according to the present embodiment, the first hook portion 50 of the right side surface 42 and the second hook portion 52 of the left side surface 44 are shaped axisymmetrically, and similarly, the third hook portion 54 of the right side surface 42 and the fourth hook portion 56 of the left side surface 44 are shaped axisymmetrically.

1-4. Camera Body 18

1-4-1. Overall Configuration

As shown in FIGS. 3, 4, etc. the camera body 18 includes a camera casing 90 (hereinafter also referred to as a "casing 90"), which is constructed by assembling a first casing part 92 and a second casing part 94.

As shown in FIG. 8, a camera lens 100 (hereinafter also referred to as a "lens 100") and an image capturing element (also referred to as an image sensor) 102 are arranged in the interior of the camera casing 90. Throughout the present specification and the claims, the image capturing element 102 is also referred to as the image sensor.

In the foregoing manner, the camera body 18 (casing 90) is basically in the form of a rectangular parallelepiped (see FIG. 1, etc.) which becomes thinner in a forward direction (the X1 direction). In addition, the recess 24 is formed on the upper surface 22 of the camera body 18. The recess 24 is formed so as not to enter into the angle of view θa of the lens 100 that is arranged inside the casing 90.

1-4-2. Recess 24

The recess 24 of the present embodiment basically is formed in the shape of a triangular pyramid or a truncated triangular pyramid, and as shown in FIGS. 6 and 8, etc., is formed by a lens side wall portion 110, a lower wall portion 112, and side wall portions 114, 116 of the casing 90. In the foregoing manner, by providing the recess 24, even though the lens 100 is disposed remotely from the vicinity of the distal end on the subject side of the camera body 18 (casing 90), the field of view of the camera body 18 can be ensured along with ensuring sufficient strength for the camera body 18.

As shown in FIG. 8, an opening 118 is formed in the lens side wall portion 110, through which the optical axis Ax of the lens 100 passes, and so as not to obstruct the field of view of the camera. As shown in FIG. 6, in the present embodiment, the opening 118 is substantially rectangular in shape.

As shown in FIG. 8, a transparent member 120 that closes the opening 118 is fixed to an inner side of the opening 118. The transparent member 120 may be constituted from glass or plastic (including a polarizing filter), for example.

Due to the presence of the opening 118 and the transparent member 120, the lens 100 and the image capturing element 102 can be disposed in the interior of the casing 90 without obstructing the field of view of the camera body 18. Moreover, at the position of the transparent member 120, the lens 100 can be arranged such that the lens 100 remains unexposed. Further, the transparent member 120 covers the opening 118, whereby entry of dust through the opening 118 into the interior of the casing 90 can be avoided.

The lower wall portion 112 and the side wall portions 114, 116 are exposed on the exterior side of the camera casing 90 facing toward the optical axis Ax more on a subject side (toward the front of the vehicle 10) than the lens 100, and are arranged so as not to obstruct the field of view of the camera body 18. The lower wall portion 112 and the side wall portions 114, 116 of the present embodiment are inclined so as to separate away from the optical axis Ax along a direction from the lens 100 toward the subject. For example, as shown in FIG. 8, the entirety of the lower wall portion 112 is inclined so as to be substantially in parallel with a virtual auxiliary line L2, which forms one of two virtual auxiliary lines L1, L2 that define the angle of view θa. The side wall portions 114, 116 are formed in a similar manner.

As indicated above, according to the present embodiment, the recess 24 is formed on the upper surface 22 of the camera body 18 (casing 90). For this reason, among the lens side wall portion 110, the lower wall portion 112, and the side wall portions 114, 116 that form the recess 24, the one that exerts the greatest influence of reflected light Lout (see FIGS. 9 and 10) of sunlight Lin on the lens 100 and the image capturing element 102 is the lower wall portion 112. Thus, the lower wall portion 112 according to the present embodiment includes a structure (to be described in greater detail later), which acts to prevent the reflected light Lout of sunlight Lin from entering the lens 100 and the image capturing element 102.

1-4-3. Lower Wall Portion 112

1-4-3-1. Outline

As noted above, the lower wall portion 112 (first wall portion) acts to prevent the reflected light Lout of sunlight Lin from entering the lens 100 and the image capturing element 102. As shown in FIG. 8, on the lower wall portion 112, plural projections 130 comprising first surfaces 132 and second surfaces 134 are arranged continuously or alongside one another in the direction of the optical axis Ax. The first surfaces 132 are made up from flat surfaces, the lens 100 sides (sides facing toward the lens 100) of which are closer to the optical axis Ax than the subject sides (sides facing toward the subject, or sides oriented toward the front of the vehicle 10) thereof, or stated otherwise, from flat surfaces that are inclined upwardly from the left side to the right side in FIG. 8. The second surfaces 134 are made up from flat surfaces, the lens 100 sides of which are more remote from the optical axis Ax than the subject sides thereof, or stated otherwise, from flat surfaces that are inclined downwardly from the left side to the right side in FIG. 8. The number of the projections 130 is two or three or more, and preferably, is five or more.

As shown in FIG. 5, as viewed in plan, the first surfaces 132 and the second surfaces 134 are basically rectangular shaped, respectively, and are arranged alternately in the direction of the optical axis Ax. As shown in FIG. 8, if the first surfaces 132 and the second surfaces 134 are compared alongside one another, the first surfaces 132 are longer than the second surfaces 134 in the direction of the optical axis. Further, as shown in FIG. 6, linear ridge lines 136 are formed by the first surfaces 132 and the second surfaces 134.

1-4-3-2. Comparative Example

To facilitate understanding of the operations and advantages of the lower wall portion 112 of the present embodiment, an explanation will be given using a comparative example.

Figure 9:
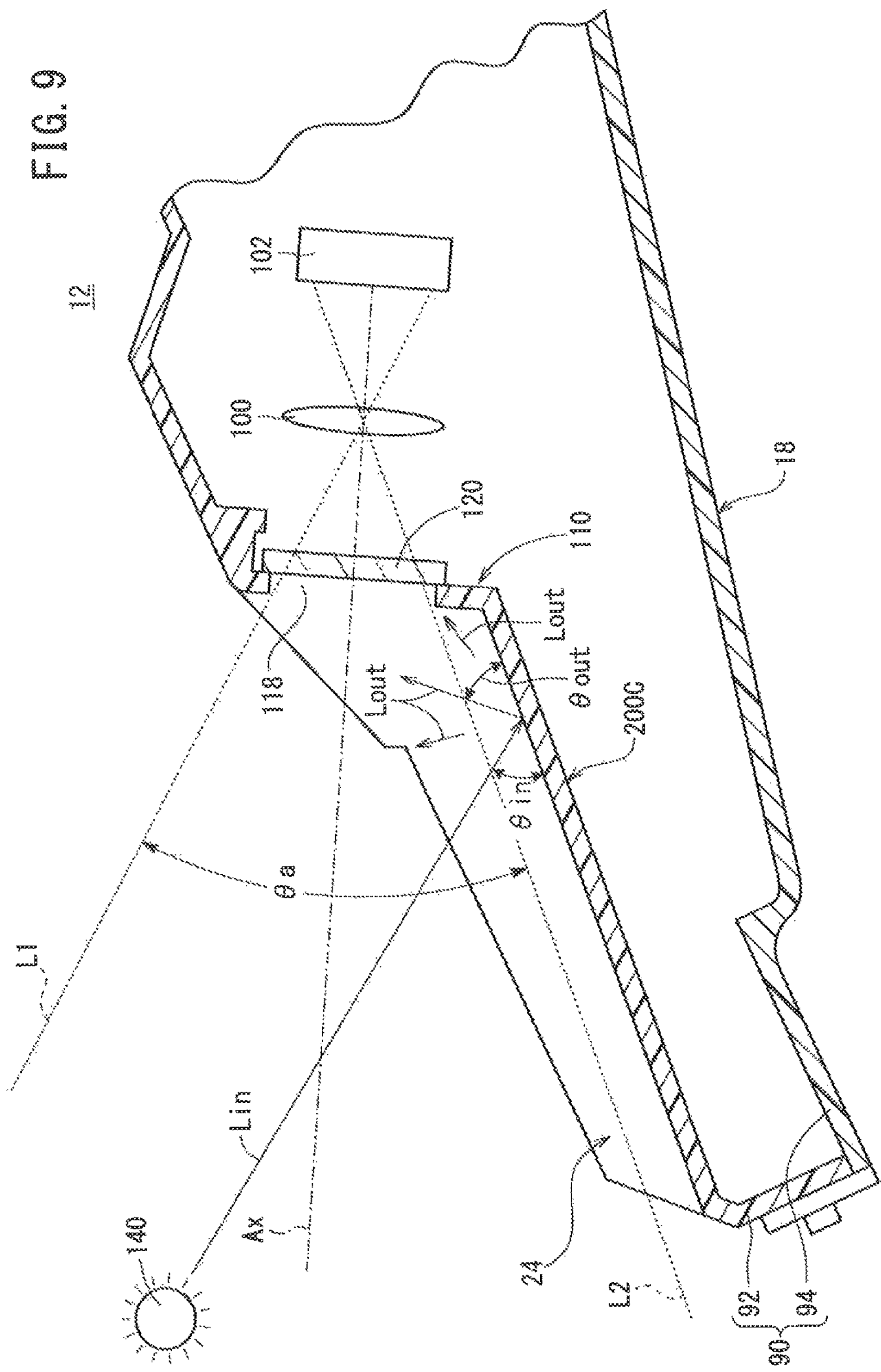
FIG. 9 is a partially enlarged cross-sectional view showing in an enlarged form a part of a lower wall portion according to a comparative example that corresponds with FIG. 8, together with descriptively showing rays of sunlight and reflected light.

FIG. 9 is a partially enlarged cross-sectional view showing in an enlarged form a part of a lower wall portion 200C according to a comparative example that corresponds with FIG. 8, together with descriptively showing rays of sunlight Lin and reflected light Lout. With the lower wall portion 200C according to the comparative example, no projections 130 are formed thereon, and the entirety of the lower wall portion 200C is flat as a whole.

In the case that the camera unit 12 is arranged as shown in FIG. 1, if the incident angle and the reflection angle of the sunlight Lin are equal, and the reflected light Lout enters the lens 100 and the image capturing element 102, then the majority of the reflected light Lout of sunlight Lin is applied to the lens 100 and the image capturing element 102. However, the reflected light Lout is scattered to a certain extent by the surface state of the casing 90. Therefore, among the reflected light Lout, cases exists in which the angle of reflection θout does not match with the angle of incidence θin of the sunlight Lin.

Consequently, even if the lower wall portion 200C is inclined so as to separate away from the optical axis Ax in a direction from the lens 100 toward the subject, the possibility exists for a portion of the reflected light Lout to enter the lens 100 and the image capturing element 102. If such a portion of the reflected light Lout is incident on the image capturing element 102, there is a possibility for image information obtained by the image capturing element 102 to become blurred or unclear.

1-4-3-3. Present Embodiment

Figure 10:
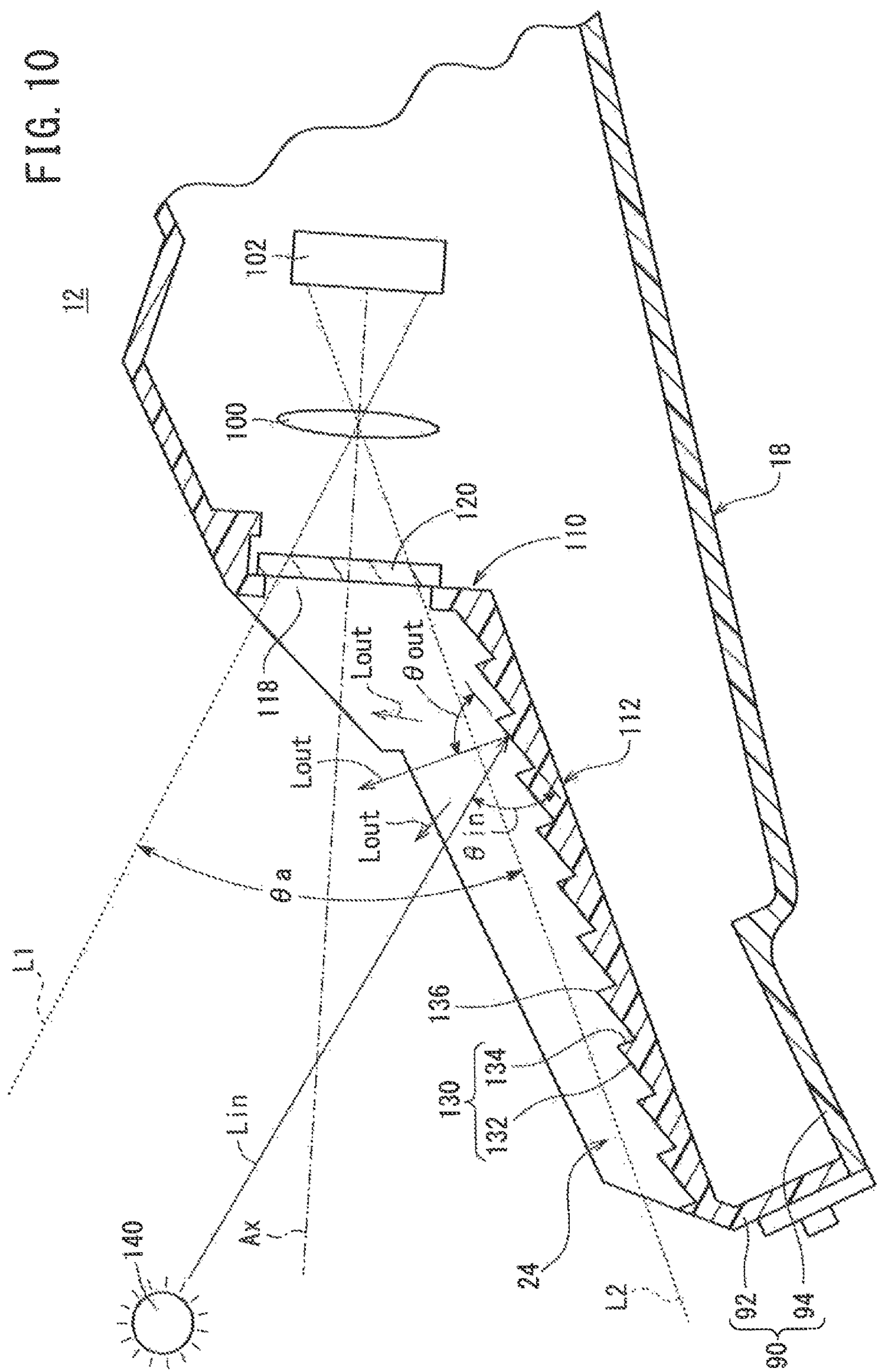
FIG. 10 is a first partially enlarged cross-sectional view showing in an enlarged form a portion of the present embodiment that corresponds with FIG. 8, together with descriptively showing rays of sunlight and reflected light.
Figure 11:
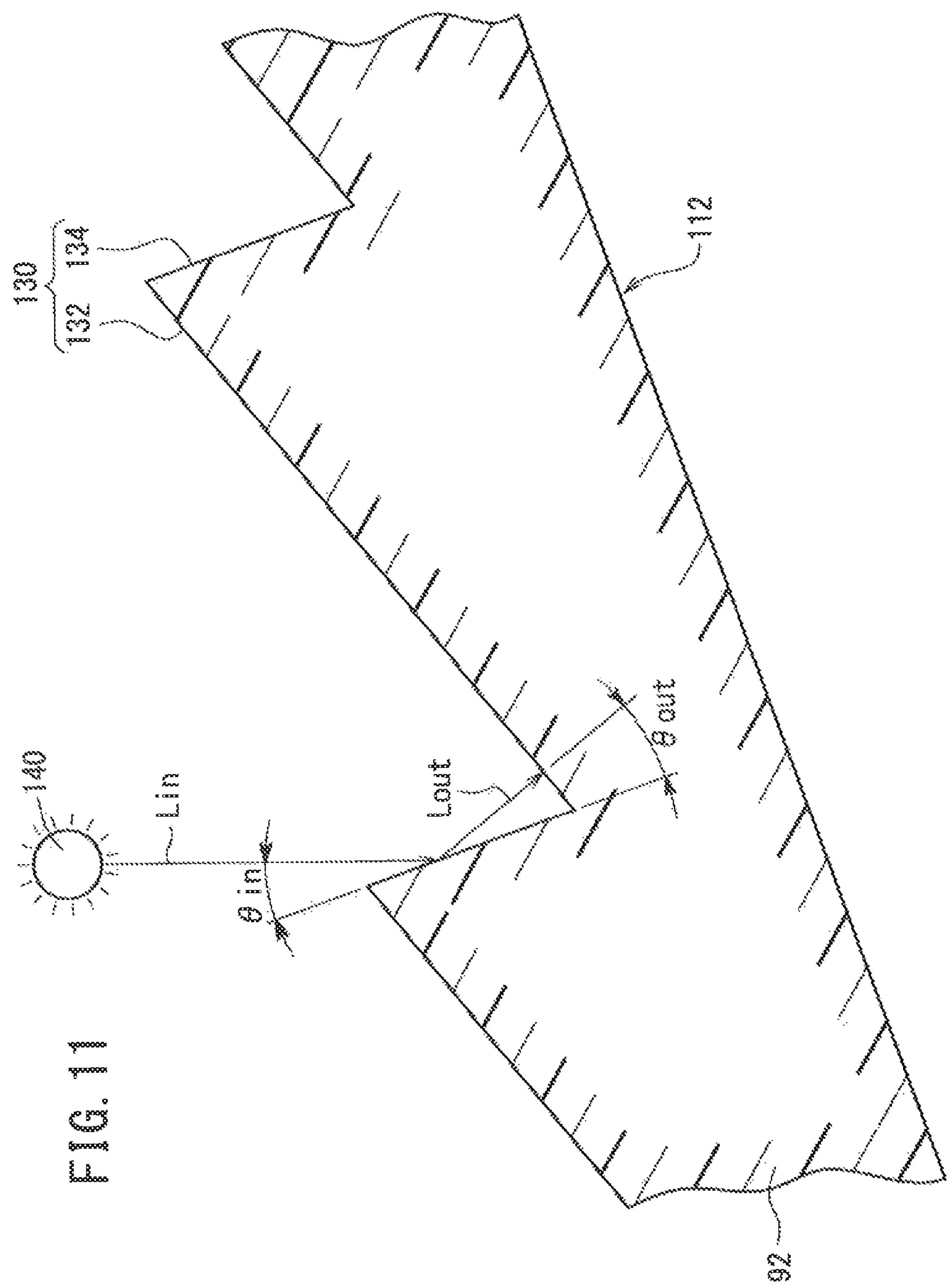
FIG. 11 is a second partially enlarged cross-sectional view showing in an enlarged form a portion of FIG. 8, together with descriptively showing rays of sunlight and reflected light.

FIG. 10 is a first partially enlarged cross-sectional view showing in an enlarged form a portion of the present embodiment that corresponds with FIG. 8, together with descriptively showing rays of sunlight Lin and reflected light Lout. FIG. 11 is a second partially enlarged cross-sectional view showing in an enlarged form a portion of FIG. 8, together with descriptively showing rays of sunlight Lin and reflected light Lout. As noted above, on the lower wall portion 112 according to the present embodiment, plural projections 130 including the first surfaces 132 and the second surfaces 134 are formed in a concave-convex shape over the entirety of the lower wall portion 112.

As has been described above in relation to the lower wall portion 200C according to the comparative example, among the reflected light Lout, scattered light exists in which the angle of reflection θout does not match with the angle of incidence θin of the sunlight Lin. Therefore, even though reflected light Lout having an angle of reflection θout that is equal to the angle of incidence θin of the sunlight Lin does not enter the lens 100 and the image capturing element 102, there is a possibility for a portion (scattered light) of the reflected light Lout to enter the lens 100 and the image capturing element 102.

In consideration of this fact, according to the present embodiment, the first surfaces 132 are provided, which are flat surfaces, the lens 100 sides of which are closer to the optical axis Ax than the subject sides thereof. In accordance with this feature, compared to the inclination of the lower wall surface 112 as a whole (which in the present embodiment, is substantially parallel with the virtual auxiliary line L2), the first surfaces 132 are closer to being perpendicular to the optical axis Ax. Accordingly, it becomes difficult for reflected light Lout from the first surfaces 132 to enter the lens 100 and the image capturing element 102. Moreover, the lower wall portion 112 may be manufactured from plastic or metal. In the case that the lower wall portion 112 is fabricated using a non-illustrated mold, preferably, the angle of the first surfaces 132 is set to be greater than or equal to a draft angle.

Next, operations and advantages of the second surfaces 134 will be described. The second surfaces 134 serve to prevent reflected light Lout from entering the lens 100 and the image capturing element 102 at times that the sun 140 is in a comparatively high position (e.g., at the position shown in FIG. 11), and further facilitate formation of the first surfaces 132.

For example, compared to a situation in which the second surfaces 134 are parallel with the optical axis Ax, according to the present embodiment, since the lens 100 sides of the second surfaces 134 are more remote from the optical axis Ax than the subject sides thereof, for example, when the sun 140 is in the position shown in FIG. 11, it becomes difficult for the reflected light Lout to enter the lens 100 and the image capturing element 102.

From the standpoint of ensuring to the greatest extent possible that reflected light Lout does not enter the lens 100 and the image capturing element 102, it is possible to incline the second surfaces 134 so as to be perpendicular with respect to the optical axis Ax, or for the second surfaces 134 to be brought close to a direction of being parallel with the first surfaces 132 (see a seventh modification in FIG. 18 which will be described later). However, from the standpoint of ease of manufacturing or processing, according to the present embodiment, the second surfaces 134 are oriented such that the lens 100 sides thereof are located more remotely from the optical axis Ax than the subject sides thereof. In particular, in this case, the lower wall portion 112 may be manufactured from plastic or metal, and in the case that the lower wall portion 112 is fabricated using a non-illustrated mold, preferably, the angle of the second surfaces 134 is set to be greater than or equal to the draft angle.

The phrase, "at times that the sun 140 is in a comparatively high position," when restated from the perspective of the camera body 18, implies a state in which the angle of incidence θin of the sunlight Lin (exterior light) is close to being perpendicular with respect to the optical axis Ax.

2. Operations and Advantages of the Present Embodiment

According to the present embodiment as described above, in a structure that has a portion of the camera casing 90 being arranged more toward the side of the subject than the lens 100 (or stated otherwise, a structure in which the lens 100 is arranged remotely from the vicinity of a distal end on the subject side of the camera casing 90), reflected light Lout (including scattered light) of sunlight Lin (external light) can be prevented from entering the lens 100 and the image capturing element 102.

The sunlight Lin, at a time that the sun 140 is positioned obliquely above the camera unit 12, for example, is external light, and the lower wall portion 112 (first wall portion) is inclined downwardly in a direction from the lens 100 toward the subject (see FIG. 8). Since the first surfaces 132 are planar surfaces, the lens 100 sides of which are closer to the optical axis Ax than the subject sides thereof, compared to the inclination of the lower wall portion 112 as a whole, the first surfaces 132 are nearer to being perpendicular with respect to the optical axis Ax. Therefore, it becomes difficult for the reflected light Lout of sunlight Lin that is incident on the first surfaces 132, including scattered light, to enter the lens 100 and the image capturing element 102.

Consequently, it is possible to achieve various features that would otherwise be difficult to realize with a structure in which the lens 100 is arranged in the vicinity of a distal end on the subject side of the camera casing 90.

According to the present embodiment, if the first surfaces 132 and the second surfaces 134 are compared alongside one another, the first surfaces 132 are longer than the second surfaces 134 in the direction of the optical axis (see FIG. 8). Premised on the fact that the lower wall portion 112 (first wall portion) is inclined so as to separate away from the optical axis Ax in a direction from the lens 100 toward the subject, if the first surfaces 132 are made longer than the adjacent second surfaces 134 in the direction of the optical axis, the first surfaces 132 are wider in area than the second surfaces 134 (see FIG. 5). In this case, it is easier for sunlight Lin (external light) to impinge on the first surfaces 132 than the second surfaces 134, and as a result, it can be made more difficult for reflected light Lout from the lower wall portion 112 as a whole to enter the lens 100 and the image capturing element 102.

In the present embodiment, the camera casing 90 includes the lens side wall portion 110 (second wall portion), which is positioned more closely to the image capturing element 102 than the lower wall portion 112 (first wall portion) at a location between the subject and the lens 100, and is formed with the opening 118 therein through which the optical axis Ax passes (see FIG. 8). In addition, the opening 118 is closed by the transparent member 120 that differs from the lens 100. Consequently, with a structure in which the lens 100 is arranged in the interior of the camera casing 90 without being exposed from the camera casing 90, dust can be prevented from entering into the camera casing 90 through the opening 118.

In the present embodiment, the camera unit 12 includes a bracket 20 for fixing the camera casing 90 to the front windshield 14 (attachment object), and the camera casing 90 is supported in a detachable manner. In addition, the camera casing 90 includes the first and second projections 30, 32 (first connectors) for connection to the bracket 20, and which are arranged on a side closer to the image capturing element 102 than the lens 100, and the third and fourth projections 34, 36 (second connectors) for connection to the bracket 20, and which are arranged on a side closer to the subject than the lens 100 (see FIG. 3).

Consequently, since the camera casing 90 is fixed to the bracket 20 both in front of and behind the lens 100, the camera casing 90 can be fixed in a relatively secure manner to the bracket 20, along with preventing entry of sunlight Lin (external light) into the lens 100 and the image capturing element 102.

With the vehicle 10 according to the present embodiment, the camera unit 12 is disposed on the front windshield 14, and the camera unit 12 captures an image in front of the vehicle 10. By this feature, a camera unit 12 can be realized in which it is difficult for sunlight Lin to enter the lens 100 and the image capturing element 102.

In the present embodiment, the angles of the first surfaces 132 and the second surfaces 134 are set to be greater than or equal to the draft angle. By this feature, in the case that a mold is used when the camera casing 90 is fabricated, a slide mold for handling an undercut is rendered unnecessary, thereby enabling a reduction in cost.

B. Modifications

The present invention is not limited to the above embodiment, and it goes without saying that various arrangements may be adopted based on the content disclosed in the present specification. For example, the present invention may adopt the following arrangements.

1. Objects to which the Present Invention is Applied

In the above embodiment, the camera unit 12 is applied to a vehicle 10. However, the camera unit 12 may also be applied to other objects, insofar as a configuration is provided that enables the camera body 18 to be used. For example, the present invention may be applied to manufacturing apparatus that make use of a camera as an image sensor for judging defects, measuring dimensions, etc. Alternatively, the present invention can be applied to equipment or systems such as a monitoring camera system for confirming affairs, preventing crime, etc.

2. Camera Body 18

According to the above embodiment, the camera body 18 is basically in the form of a rectangular parallelepiped, which is progressively thinner in the forward direction (X1 direction). However, the camera body 18 is not limited to such a configuration, insofar as the camera body 18 includes the other features thereof, for example, the plural projections 130 provided on the lower wall portion 112. For example, the camera body 18 may basically be in the form of a circular or cylindrical column.

3. Bracket 20

According to the above embodiment, the bracket 20 is fixed by an adhesive to the front windshield 14. However, the bracket 20 may be fixed by way of another means to the attachment object. For example, the bracket 20 may be fixed by bolts to the roof 16 of the vehicle 10.

According to the above embodiment, the bracket 20 supports the camera body 18 through the upper surface 22, the right side surface 26, and the left side surface 28 thereof (see FIG. 2). Stated otherwise, although the camera body 18 is supported from above the camera body 18, the bracket 20 may support the camera body 18 in a different posture, which can be changed depending on the application and manner of use of the camera body 18. For example, the bracket 20 may be positioned beneath the camera body 18.

4. First Through Fourth Projections 30, 32, 34, 36 and First Through Fourth Hook Portions 50, 52, 54, 56

[4-1. Common Features]

According to the above embodiment, the first projection 30 and the second projection 32 are disposed symmetrically in left and right directions (Y1 and Y2 directions), and the first hook portion 50 and the second hook portion 52 are disposed at corresponding positions. However, any one of these may be shifted in position and disposed in a more forward or rearward direction (X1 and X2 directions). The third projection 34, the fourth projection 36, the third hook portion 54, and the fourth hook portion 56 may also be handled in the same manner.

According to the above embodiment, the four projections (first through fourth projections 30, 32, 34, 36) and the four hook portions (first through fourth hook portions 50, 52, 54, 56) are used in combination. However, the present invention is not limited to such a method of assembly, insofar as attention is paid to the individual actions and advantages thereof. For example, a structure may be provided in which only the first projection 30, the second projection 32, the first hook portion 50, and the second hook portion 52 are used. In this case, by forming the first projection 30 and the second projection 32 to be longer in the longitudinal direction (X1 and X2 directions), the camera body 18 can be prevented from rotating with respect to the bracket 20.

[4-2. First Through Fourth Hook Portions 50, 52, 54, 56]

According to the above embodiment, the right base section 80 is provided in addition to the first hook portion 50 and the third hook portion 54 (see FIG. 7). However, a structure can be provided in which the first hook portion 50 and the third hook portion 54 project out directly from the central base part 40. In the same manner, although the left base section 82 is provided in addition to the second hook portion 52 and the fourth hook portion 56, a structure can be provided in which the second hook portion 52 and the fourth hook portion 56 project out directly from the central base part 40.

5. Plate Springs 70*a*, 70*b*

According to the above embodiment, the camera body 18 is urged in a downward direction (Z2 direction) using the plate springs 70*a*, 70*b*. However, from the standpoint of urging the camera body 18 downwardly, other types of elastic members (for example, coils springs) may be used. Alternatively, insofar as attention is focused on operations and advantages apart from those of the plate springs 70*a*, 70*b*, it also is possible to provide a structure that does not include the plate springs 70*a*, 70*b*.

6. Camera Lens 100 and Image Capturing Element 102

According to the above embodiment, the camera lens 100 and the image capturing element 102 are arranged on a rearward side of the casing 90 from the center in the direction of the optical axis (see FIG. 8). However, from the standpoint of other features of the invention (for example, the point of disposing the lens 100 within the casing 90 remotely from the vicinity of the distal end, i.e., the left end in FIG. 8, on the subject side), the invention is not limited to this feature. For example, the lens 100 and the image capturing element 102 may be disposed on a forward or front side from the center of the casing 90.

7. Lower Wall Portion 112 (First Wall Portion)

[7-1. Configuration of First Surfaces 132 and Second Surfaces 134]

(7-1-1. Shape as Viewed in Plan)

In the above embodiment, both of the first surfaces 132 and the second surfaces 134 are quadrangular (rectangular shaped) as viewed in plan (see FIGS. 5 and 8). However, from the standpoint of making it difficult for reflected light Lout of exterior light such as sunlight Lin or the like to enter the lens 100 and the image capturing element 102, as shown in FIGS. 12 through 14, the first surfaces 132 and the second surfaces 134 may be of shapes that are other than quadrangular as viewed in plan.

Figure 12:
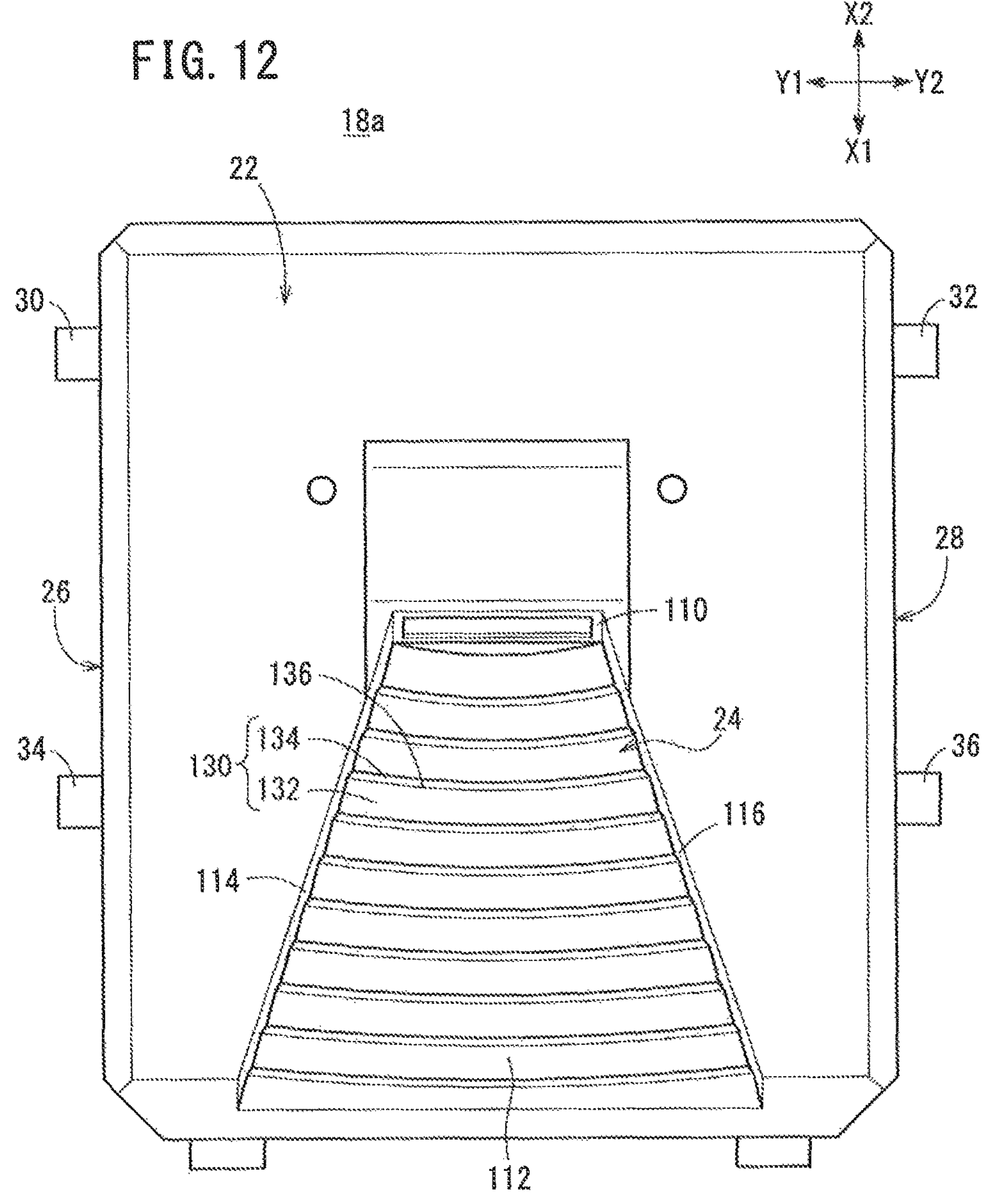
FIG. 12 is a plan view of a camera body according to a first modification.

FIG. 12 is a plan view (in the Z2 direction) of a camera body 18*a* according to a first modification. On the camera body 18*a*, any of the first surfaces 132 and the second surfaces 134 are of an arcuate shape (curved surface shape) as viewed in plan.

Figure 13:
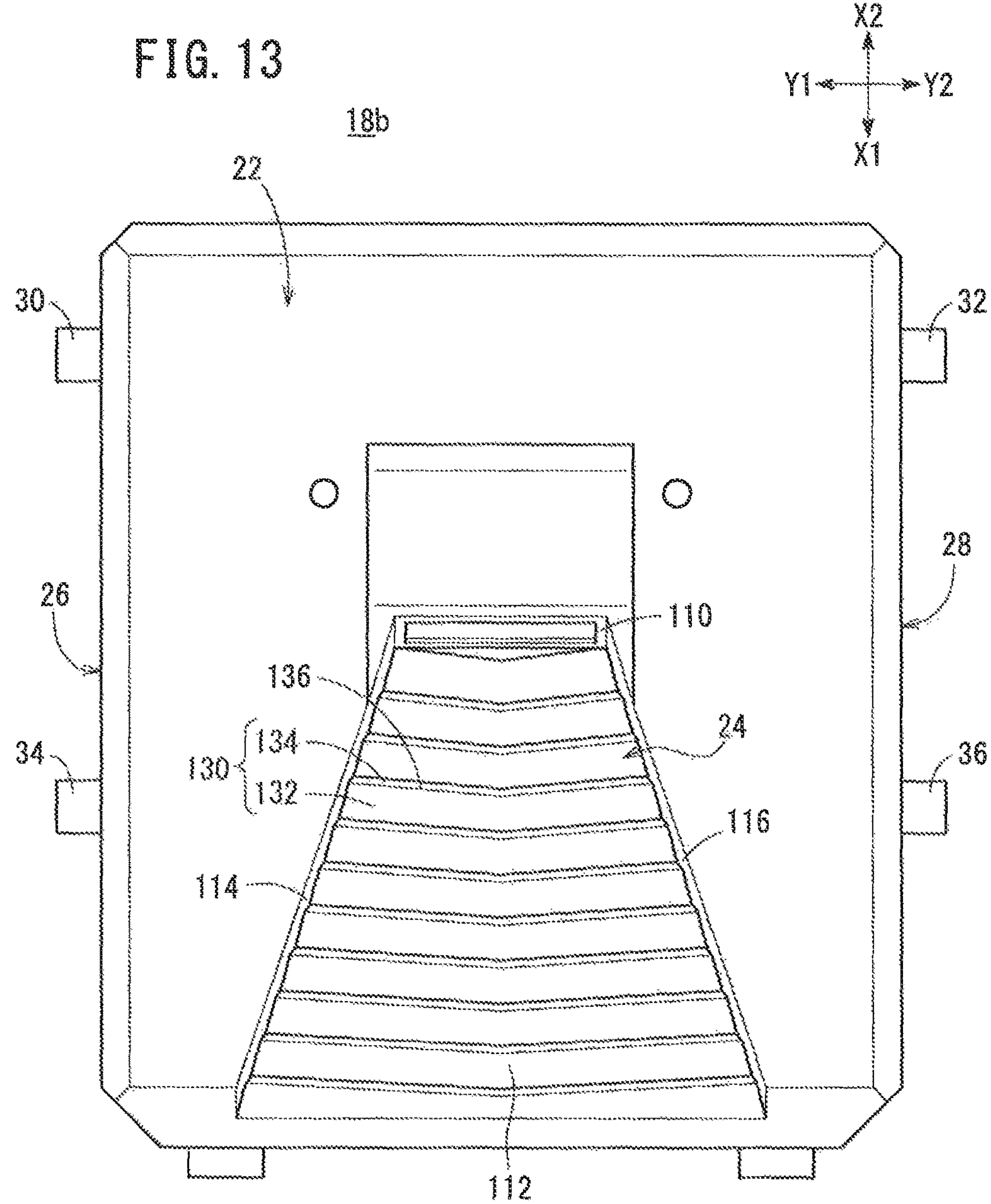
FIG. 13 is a plan view of a camera body according to a second modification.

FIG. 13 is a plan view (in the Z2 direction) of a camera body 18*b* according to a second modification. On the camera body 18*b*, any of the first surfaces 132 and the second surfaces 134 are based on a quadrangular (substantially rectangular) shape, which is bent in the vicinity of a center thereof.

Figure 14:
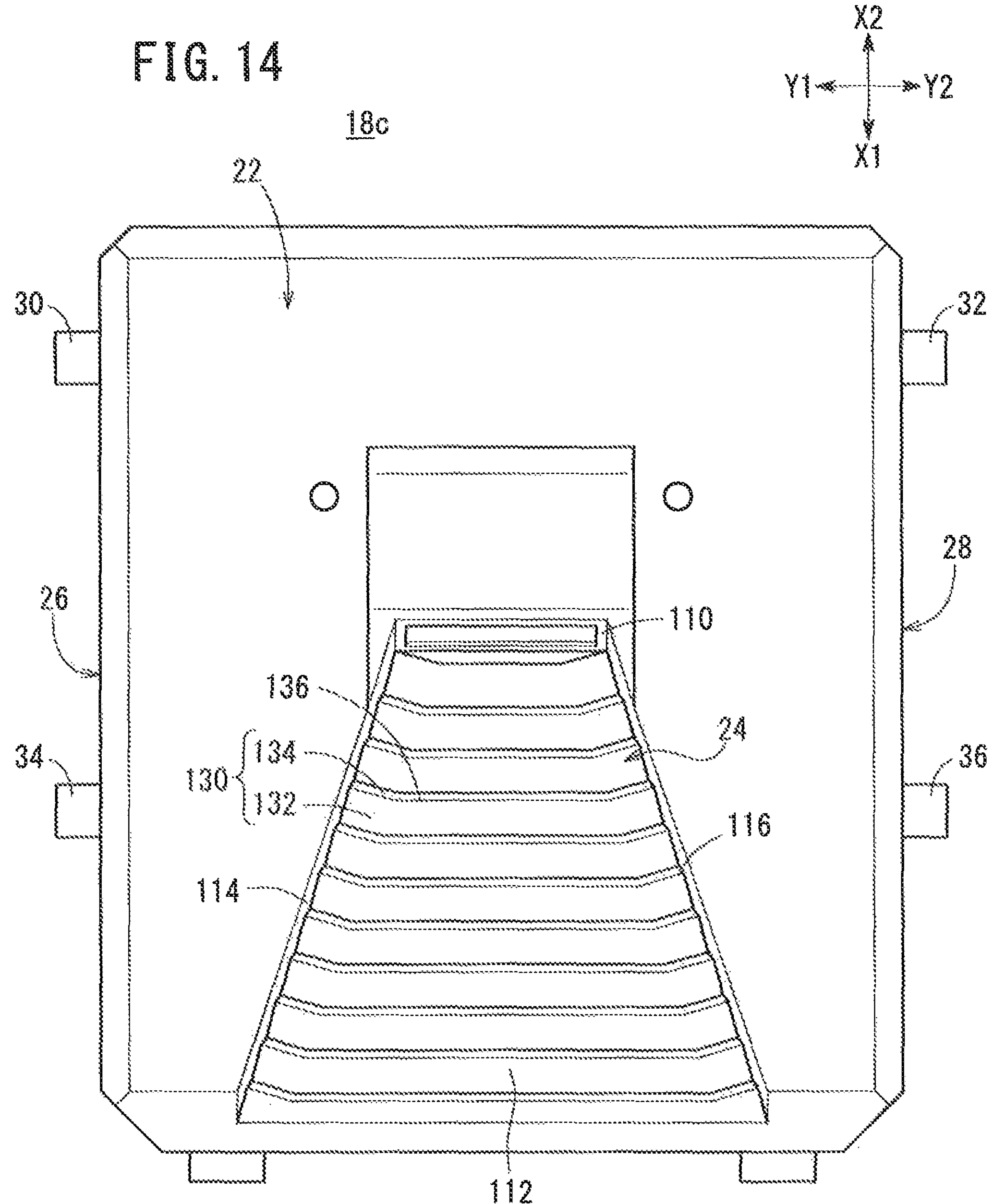
FIG. 14 is a plan view of a camera body according to a third modification.

FIG. 14 is a plan view (in the Z2 direction) of a camera body 18*c* according to a third modification. On the camera body 18*c*, any of the first surfaces 132 and the second surfaces 134 are based on a quadrangular (substantially rectangular) shape, which is bent at two locations.

(7-1-2. Shape as Viewed from the Front)

In the above embodiment, the ridge lines 136 formed from the first surfaces 132 and the second surfaces 134 are linear or straight as viewed from the front (see FIG. 6). However, from the standpoint of making it difficult for reflected light Lout of exterior light such as sunlight Lin or the like to enter the lens 100 and the image capturing element 102, as shown in FIGS. 15 and 16, the ridge lines 136 may be of shapes that are other than linear as viewed from the front.

Figure 15:
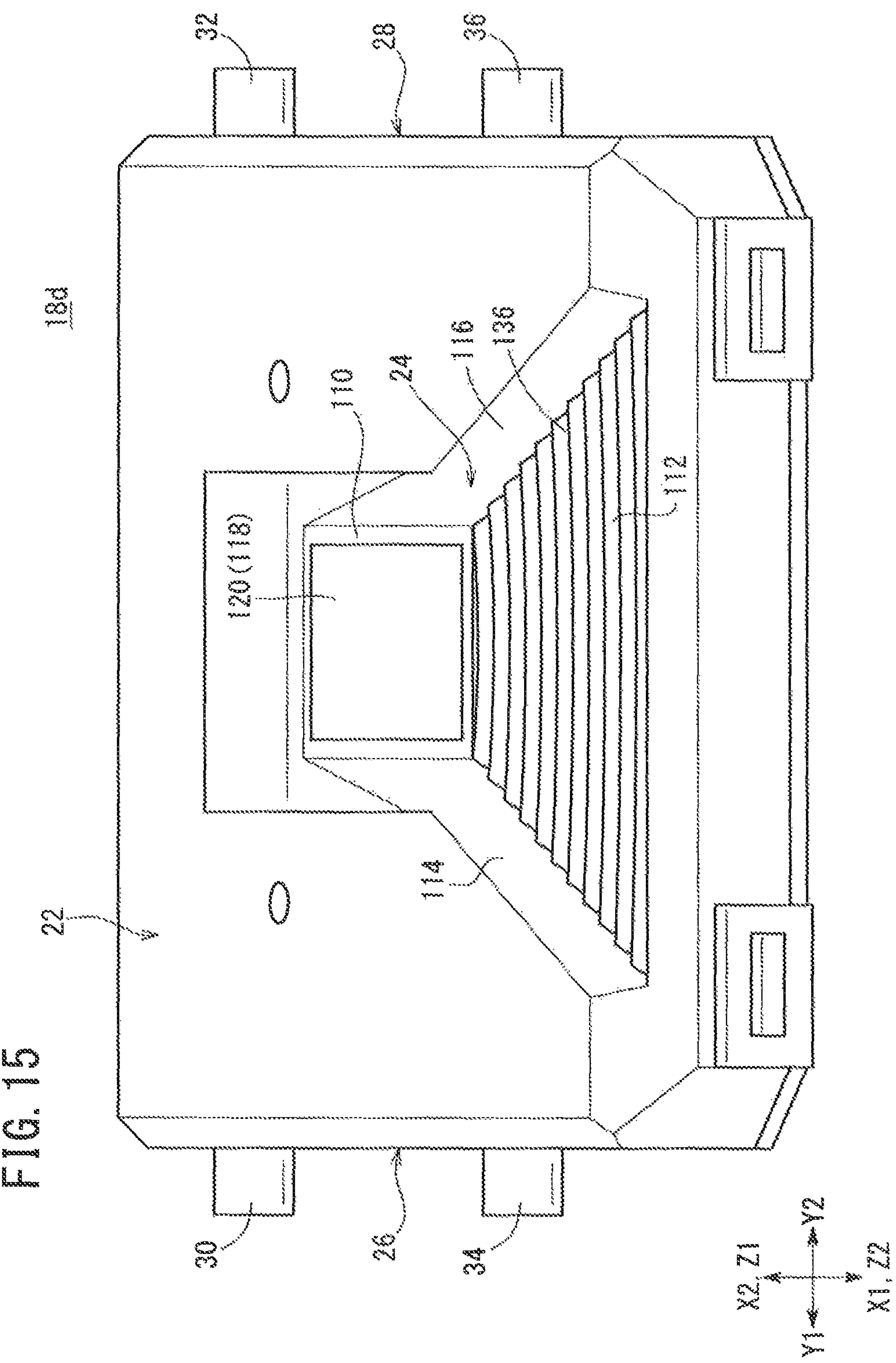
FIG. 15 is a perspective view showing a front surface and a top surface of a camera body according to a fourth modification.

FIG. 15 is a perspective view showing (as viewed from the X2 and Z2 directions) a front surface and a top surface of the camera body 18*d* according to a fourth modification. On the camera body 18*d*, the ridge lines 136 formed by the first surfaces 132 and the second surfaces 134 are of a curvilinear shape as viewed from the front.

Figure 16:
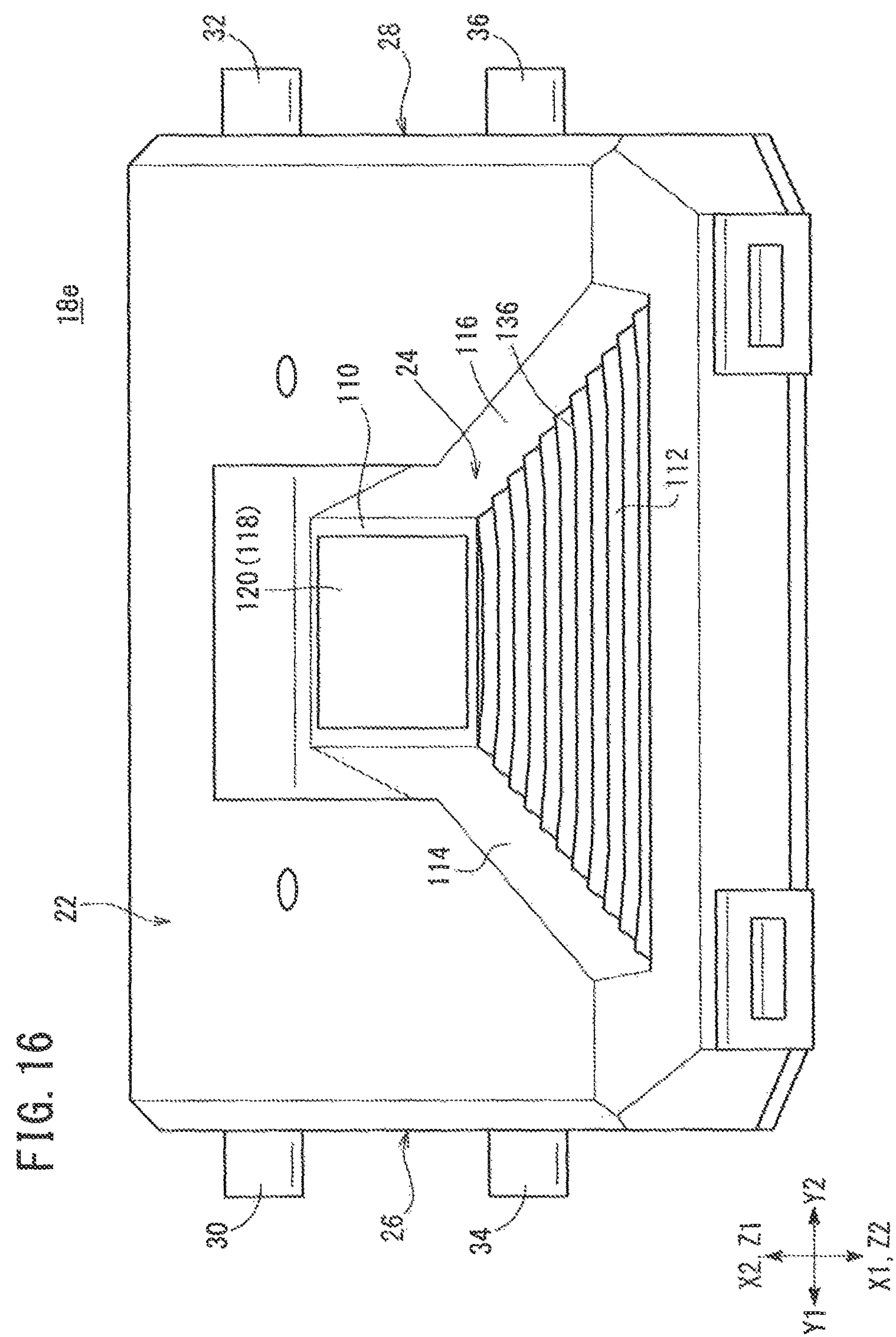
FIG. 16 is a perspective view showing a front surface and a top surface of a camera body according to a fifth modification.

FIG. 16 is a perspective view showing (as viewed from the X2 and Z2 directions) a front surface and a top surface of the camera body 18*e* according to a fifth modification. On the camera body 18*e*, the ridge lines 136 formed by the first surfaces 132 and the second surfaces 134 are of a bent linear shape as viewed from the front.

(7-1-3. Cross-Sectional Shape Including Optical Axis Ax)

With the present embodiment, in a cross-section thereof including the optical axis Ax, if the first surfaces 132 and the second surfaces 134 are compared alongside one another, the first surfaces 132 are longer than the second surfaces 134 in the direction of the optical axis (see FIG. 8). However, from the standpoint of making it difficult for reflected light Lout of exterior light such as sunlight Lin or the like to enter the lens 100 and the image capturing element 102, the first surfaces 132 need not necessarily be longer than the second surfaces 134 in the direction of the optical axis.

Figure 17:
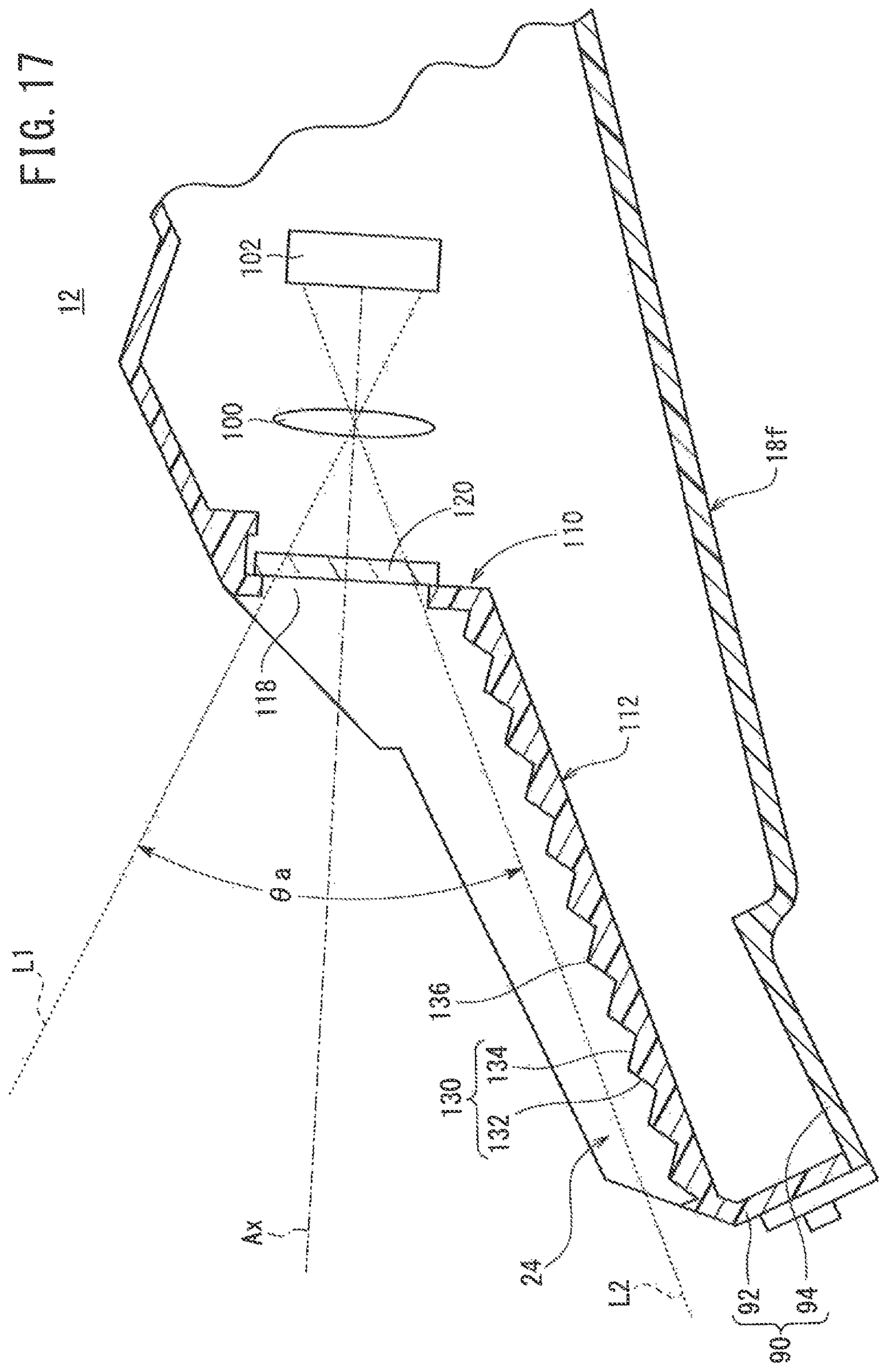
FIG. 17 is a cross-sectional view of a camera body according to a sixth modification, as viewed from a position that corresponds with that of FIG. 8.

FIG. 17 is a cross-sectional view of a camera body 18*f* according to a sixth modification, as viewed from a position that corresponds with that of FIG. 8. On the camera body 18*f*, the second surfaces 134 are longer in the direction of the optical axis than the first surfaces 132.

With the present embodiment, in a cross-section thereof including the optical axis Ax, the respective angles of the first surfaces 132 and the second surfaces 134 are as shown in FIG. 8. However, from the standpoint of making it difficult for reflected light Lout of exterior light such as sunlight Lin or the like to enter the lens 100 and the image capturing element 102, the respective angles of the first surfaces 132 and the second surfaces 134 may be angles apart from those shown in FIG. 8.

Figure 18:
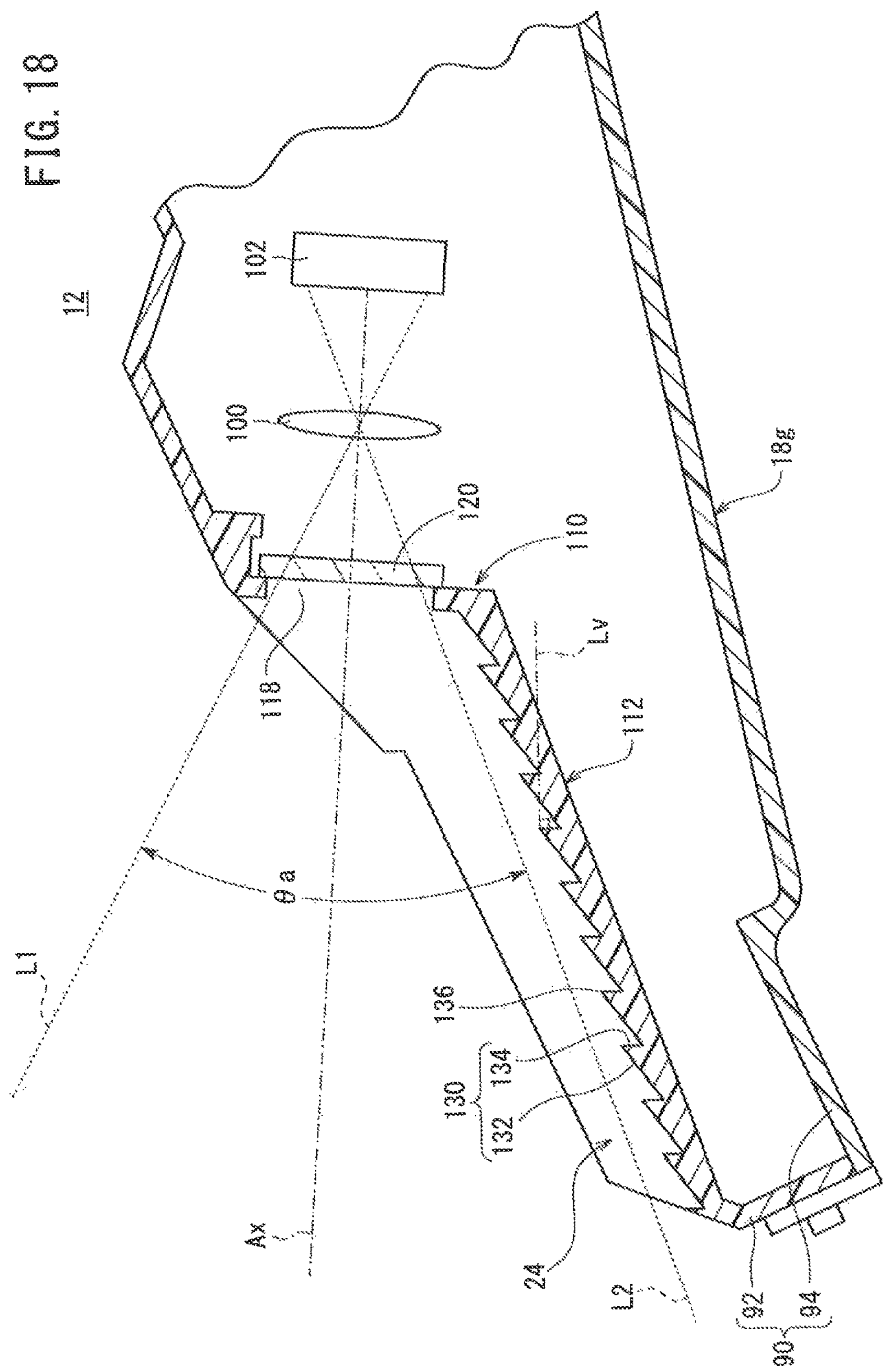
FIG. 18 is a cross-sectional view of a camera body according to a seventh modification, as viewed from a position that corresponds with that of FIG. 8.

FIG. 18 is a cross-sectional view of a camera body 18*g* according to a seventh modification, as viewed from a position that corresponds with that of FIG. 8. On the camera body 18*g*, the first surfaces 132 are planar shaped, the lens 100 sides of which are closer to the optical axis Ax than the subject sides thereof, whereas the second surfaces 134 are of planar shapes that are perpendicular with respect to the optical axis Ax.

On the camera body 18*g*, the lower wall portion 112 is inclined so as to separate away from the optical axis Ax along a direction from the lens 100 toward the subject. Therefore, with the camera body 18*g*, a line Lv, which is drawn perpendicularly toward the side of the lens 100 at a position closest to the optical axis Ax side of each of the second surfaces 134, intersects the adjacent first surfaces 132 on the lens 100 side thereof with respect to the second surfaces 134. In accordance therewith, the majority of the reflected light Lout from sunlight Lin (external light) that is incident on the second surfaces 134 is made incident on the first surfaces 132, and as a result, entry of such reflected light into the lens 100 and the image capturing element 102 can be avoided.

Figure 19:
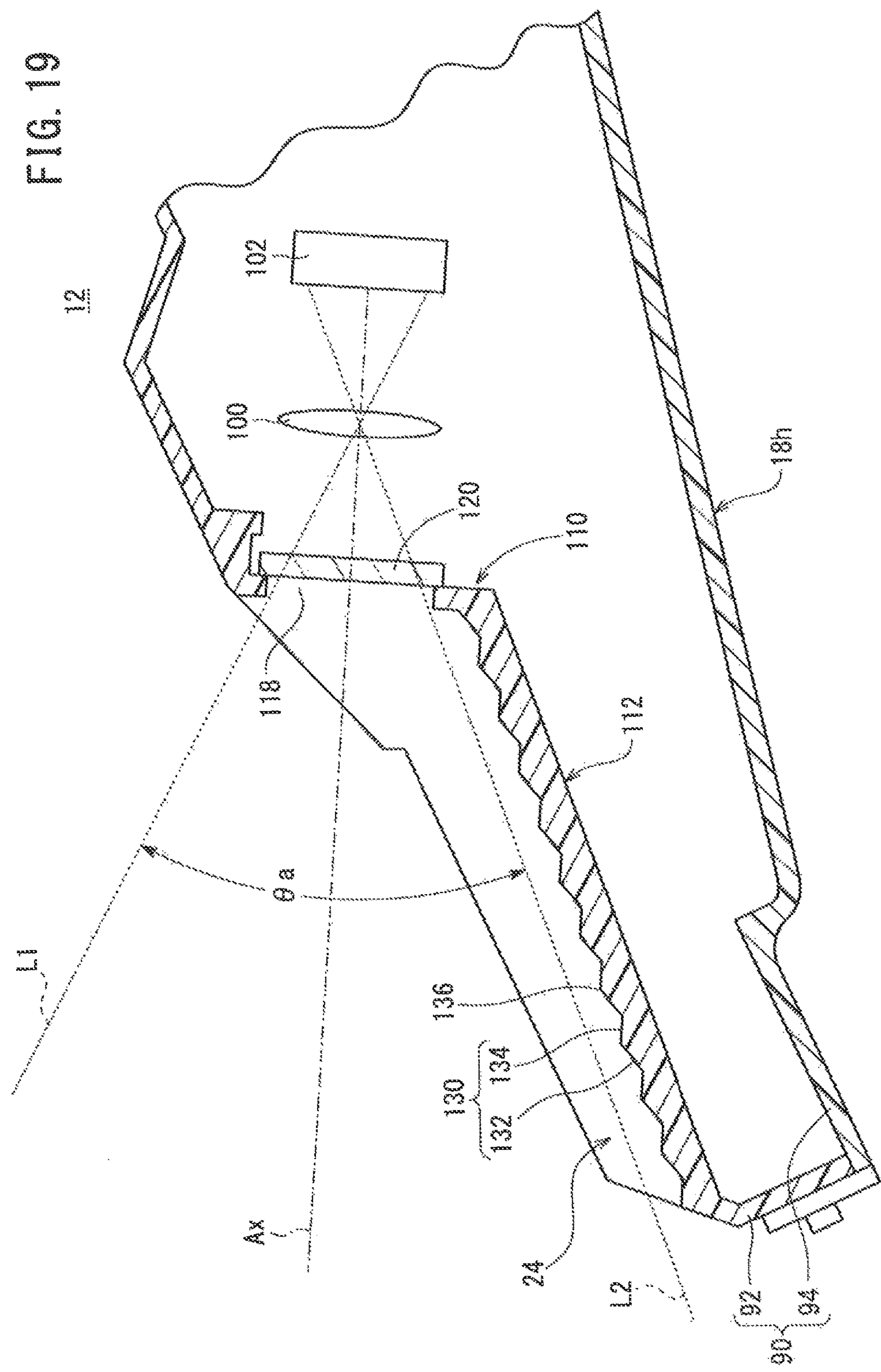
FIG. 19 is a cross-sectional view of a camera body according to an eighth modification, as viewed from a position that corresponds with that of FIG. 8.

FIG. 19 is a cross-sectional view of a camera body 18*h* according to an eighth modification, as viewed from a position that corresponds with that of FIG. 8. On the camera body 18*h*, the first surfaces 132 are planar shaped, the lens 100 sides of which are closer to the optical axis Ax than the subject sides thereof, whereas the second surfaces 134 are of planar shapes that are parallel to the optical axis Ax.

To further describe the structure, which is different from that of FIG. 19, in the aforementioned embodiment, as viewed in cross section including the optical axis Ax, the lens 100 sides of the first surfaces 132 are located more closely to the optical axis Ax than the subject sides thereof, whereas the lens 100 sides of the second surfaces 134 are more remote from the optical axis Ax than the subject sides thereof (see FIG. 8). However, from the standpoint of making it difficult for reflected light Lout of exterior light such as sunlight Lin or the like to enter the lens 100 and the image capturing element 102, both of the first surfaces 132 and the second surfaces 134 may be arranged such that the lens 100 sides thereof are closer to the optical axis Ax than the subject sides thereof. Stated otherwise, in FIG. 8, the projections 130 may be configured such that the second surfaces 134 extend from a left lower side to a right upper side (and as a result, spaces can be provided that exist downwardly from the second surfaces 134).

According to the above embodiment, plural projections 130 are arranged continuously without intervals therebetween (see FIG. 8). However, from the standpoint of making it difficult for reflected light Lout of exterior light such as sunlight Lin or the like to enter the lens 100 and the image capturing element 102, the projections 130 may also be arranged continuously with gaps placed between the adjacent projections 130.

Figure 20:
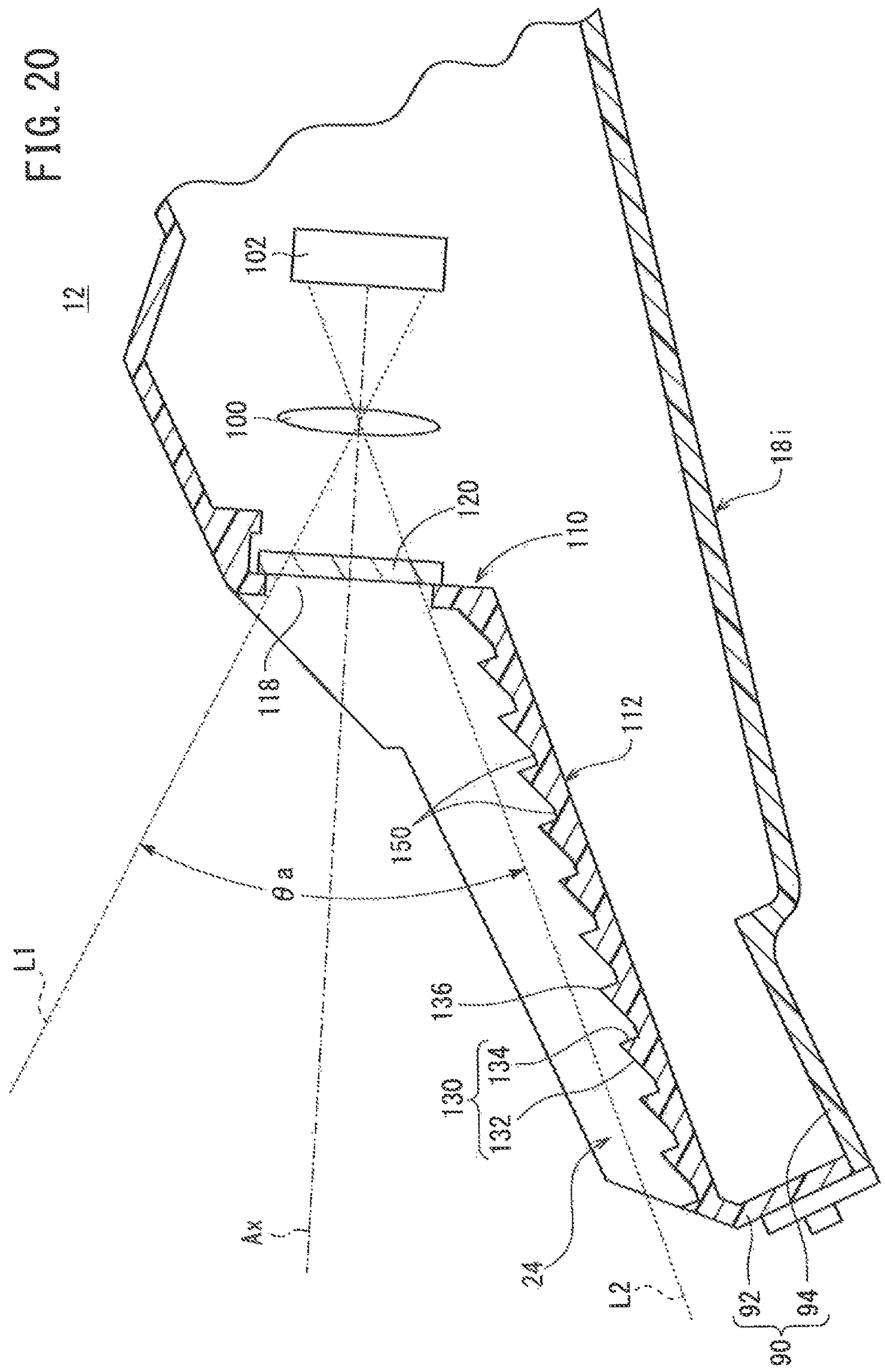
FIG. 20 is a cross-sectional view of a camera body according to a ninth modification, as viewed from a position that corresponds with that of FIG. 8.

FIG. 20 is a cross-sectional view of a camera body 18*i* according to a ninth modification, as viewed from a position that corresponds with that of FIG. 8. With the camera body 18*i*, third surfaces 150 are interposed as gaps between the projections 130. Similar to the inclination of the lower wall portion 112 as a whole, the third surfaces 150 are substantially parallel to the virtual auxiliary line L2.

According to the above embodiment, among the plural projections 130, the cross-sectional shapes of the first surfaces 132 and the second surfaces 134 are the same (see FIG. 8). For example, in the direction of the optical axis, the lengths of the respective first surfaces 132 are equal, and further, the lengths of the respective second surfaces 134 are equal. However, from the standpoint of making it difficult for reflected light Lout of exterior light such as sunlight Lin or the like to enter the lens 100 and the image capturing element 102, on each of the projections 130, the shapes of the first surfaces 132 and the second surfaces 134 can be formed differently.

Figure 21:
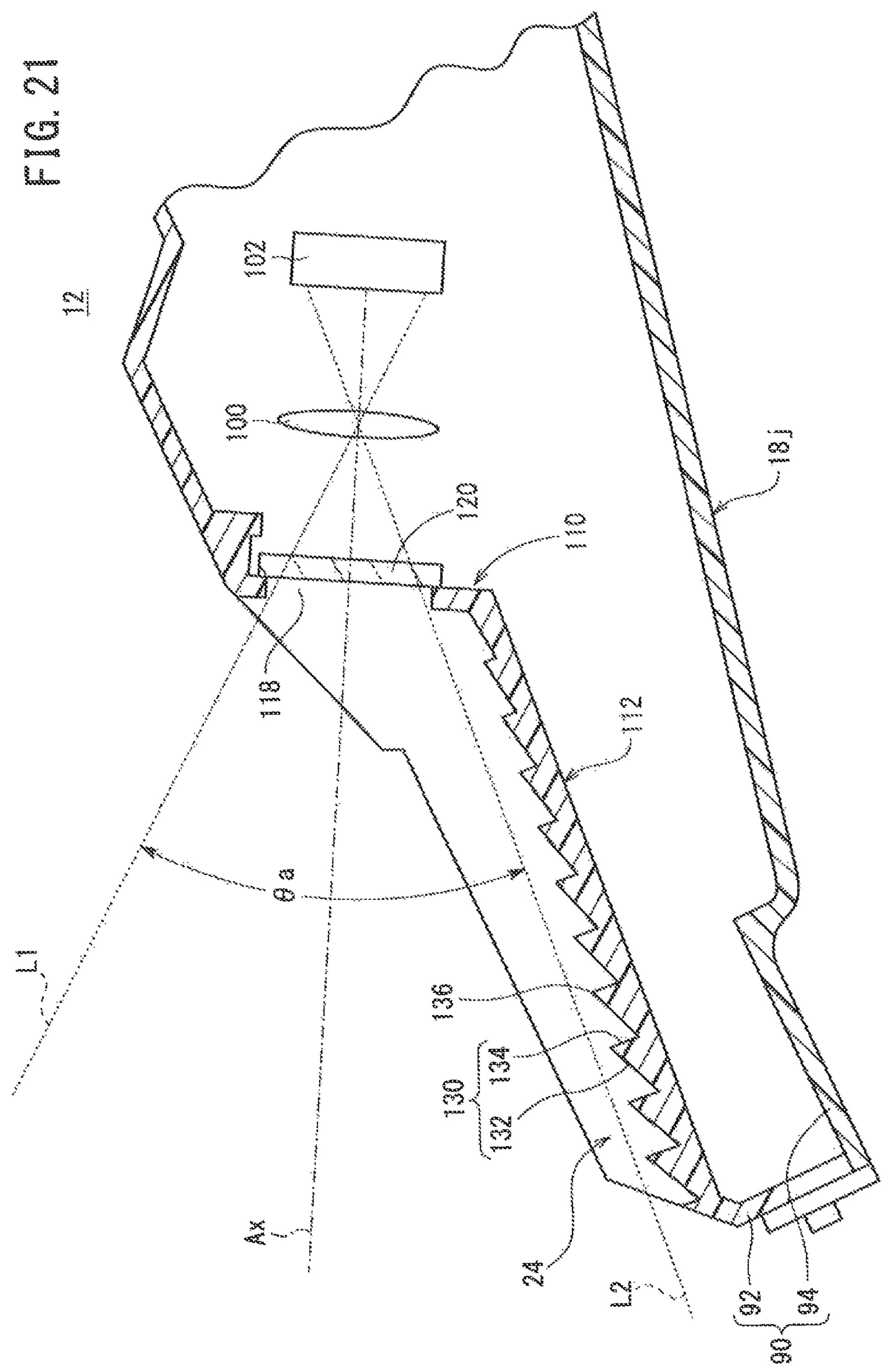
FIG. 21 is a cross-sectional view of a camera body according to a tenth modification, as viewed from a position that corresponds with that of FIG. 8.

FIG. 21 is a cross-sectional view of a camera body **18*j* according to a tenth modification, as viewed from a position that corresponds with that of FIG. 8. On the camera body 18*j*, the projections 130** become larger along the direction toward the side of the subject.

With the present embodiment, in a cross-section thereof including the optical axis Ax, any of the first surfaces 132 and the second surfaces 134 are planar (linearly shaped). However, from the standpoint of making it difficult for reflected light Lout of exterior light such as sunlight Lin or the like to enter the lens 100 and the image capturing element 102, in a cross section including the optical axis Ax, each of the first surfaces 132 and the second surfaces 134 may be of a curved (curvilinear) shape.

Figure 22:
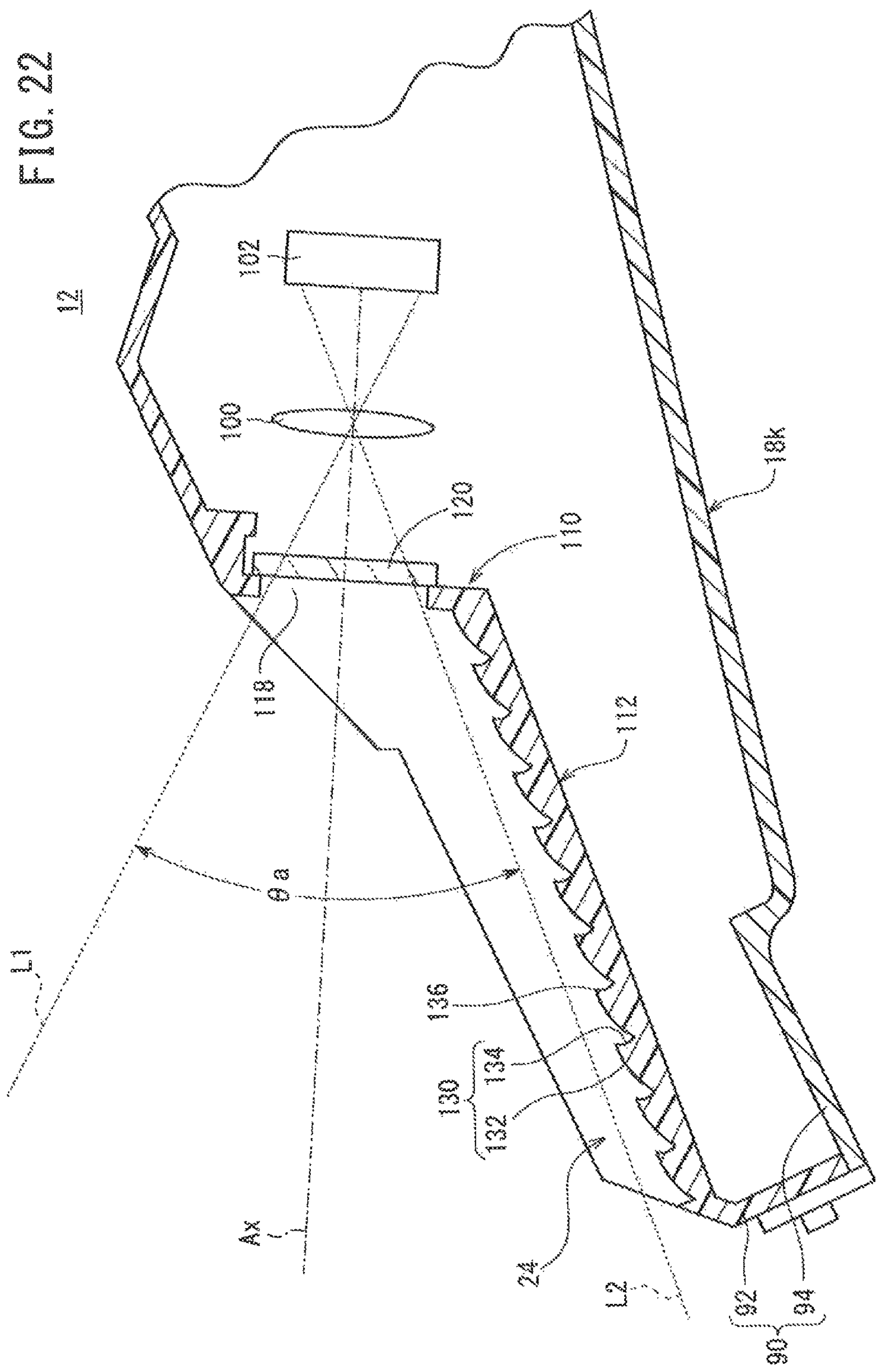
FIG. 22 is a cross-sectional view of a camera body according to an eleventh modification, as viewed from a position that corresponds with that of FIG. 8.

FIG. 22 is a cross-sectional view of a camera body **18*k* according to an eleventh modification, as viewed from a position that corresponds with that of FIG. 8. On the camera body 18*k*, the first surfaces 132 are curved (curvilinear shaped) projections oriented toward the optical axis Ax, whereas the second surfaces 134 are curved (curvilinear shaped) recesses that are recessed with respect to the optical axis Ax. Conversely, the first surfaces 132 may be curved (curvilinear shaped) recesses oriented toward the optical axis Ax, whereas the second surfaces 134 may be curved (curvilinear shaped) projections with respect to the optical axis Ax. Alternatively, any of the first surfaces 132 and the second surfaces 134** may be curved (curvilinear shaped) projections or recesses oriented toward the optical axis Ax.

In the above embodiment and in each of the modified examples, descriptions have been given bearing in mind accurate control or design of the shapes of both the first surfaces 132 and the second surfaces 134. However, for example, if the projections 130 are fine or minutely shaped, only the first surfaces 132 may be controlled or designed with high precision, whereas errors may be tolerated relatively in the second surfaces 134. In this case, on each of the projections 130, variations may appear in the shapes of the second surfaces 134.

[7-2. Positions of the Projections 130]

According to the above embodiment, the projections 130 are disposed on the lower wall portion 112 so as to most easily receive the influence of sunlight Lin (see FIG. 8). However, from the standpoint of the other features thereof (for example, the point of reducing the influence of external light apart from sunlight Lin), the projections 130 may be disposed in other positions. For example, in addition to being provided on the lower wall portion 112 or instead of being provided on the lower wall portion 112, the projections 130 may also be disposed on either one or both of the side wall portions 114, 116.

[7-3. Arrangement of Lower Wall Portion 112]

According to the above embodiment, the lower wall portion 112 is inclined so as to separate away from the optical axis Ax along a direction from the lens 100 toward the subject (see FIG. 8). However, from the standpoint of making it difficult for reflected light Lout of exterior light such as sunlight Lin or the like to enter the lens 100 and the image capturing element 102, the lower wall portion 112 may extend in a direction parallel to the optical axis Ax.

Figure 23:
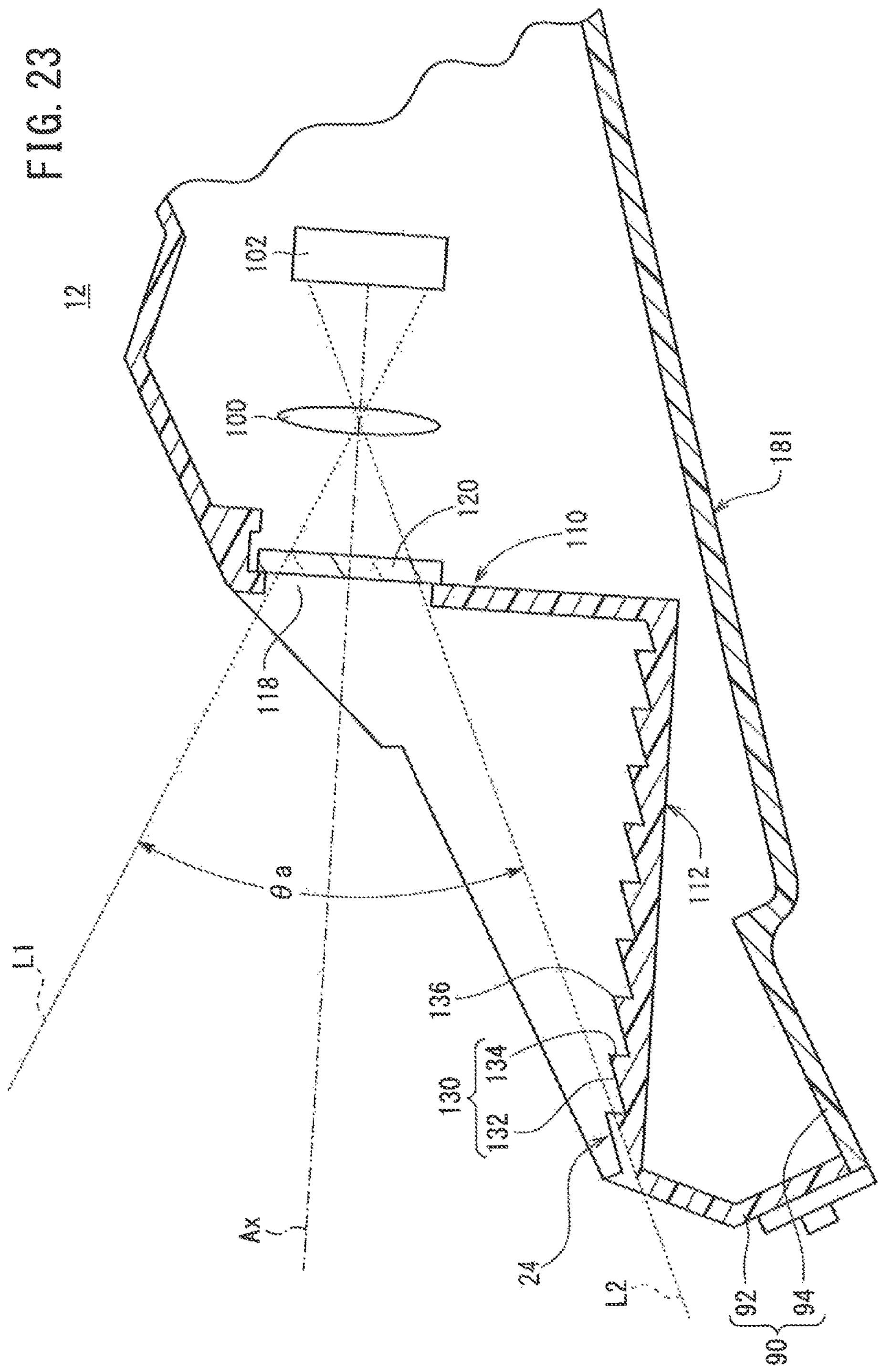
FIG. 23 is a cross-sectional view of a camera body according to a twelfth modification, as viewed from a position that corresponds with that of FIG. 8.

FIG. 23 is a cross-sectional view of a camera body **18*l* according to a twelfth modification, as viewed from a position that corresponds with that of FIG. 8. On the camera body 18*l*, the lower wall portion 112** extends parallel to the optical axis Ax.

8. Sunlight Lin (External Light)

According to the present embodiment, although the reflected light Lout (including scattered light) as an object that is to be prevented from entering the lens 100 and the image capturing element 102 is reflected light Lout from sunlight Lin (see FIGS. 10 and 11), such reflected light whose entry is prevented may be from a source of external light other than sunlight.

The invention claimed is:

1. A camera unit comprising:

a camera casing, a lens, and an image sensor that is disposed in interior of the camera casing, wherein:

a recess is formed in the camera casing on a side that is closer to a subject than is the lens;

at least a portion of the recess is formed by a first wall portion, which is exposed on an exterior side of the camera casing and faces toward an optical axis;

the first wall portion extends in parallel with the optical axis or is inclined so as to space away from the optical axis as the first wall portion extends from the lens toward the subject; and a plurality of projections are arranged on the first wall portion alongside one another in a direction of the optical axis, each of the plurality of projections comprising:

a first surface, which is a flat or curved surface, one side of the first surface close to the lens being closer to the optical axis than another side of the first surface facing toward the subject;

a second surface which is a flat or curved surface, and which extends substantially perpendicular to the optical axis, wherein the first surface and the second surface of each of the plurality of projections are arranged such that an imaginary line extending perpendicularly to the second surface from an apex of the projection toward the lens intersects the first surface facing toward the second surface.

2. The camera unit according to claim 1, wherein, when the first surface and the second surface are compared alongside one another, the first surface is longer than the second surface in the direction of the optical axis.

3. The camera unit according to claim 1, wherein at least five of the projections, which are of the same shape, are arranged in the direction of the optical axis.

4. The camera unit according to claim 1, wherein:

the camera casing includes a second wall portion, which is positioned closer to the image sensor than the first wall portion at a location between the subject and the lens, and which is formed with an opening therein through which the optical axis passes; and the opening is closed by a transparent member that differs from the lens.

5. The camera unit according to claim 1, further comprising a bracket configured to fix the camera casing to an attachment object, and to support the camera casing in a detachable manner, wherein the camera casing further comprises:

a first connector for connection to the bracket, and which is arranged on a side closer to the image sensor than the lens; and a second connector for connection to the bracket, and which is arranged on a side closer to the subject than the lens.

6. A vehicle in which a camera unit is disposed on a front windshield thereof, wherein:

the camera unit comprises a camera casing, a lens, and an image sensor that is disposed in interior of the camera casing;

a recess is formed in the camera casing on a side that is closer to a subject than is the lens;

at least a portion of the recess is formed by a first wall portion, which is exposed on an exterior side of the camera casing and faces toward an optical axis;

the first wall portion extends in parallel with the optical axis or is inclined so as to space away from the optical axis as the first wall portion extends from the lens toward the subject; and a plurality of projections are arranged on the first wall portion alongside one another in a direction of the optical axis, each of the plurality of projections comprising:

a first surface, which is a flat or curved surface, one side of the first surface close to the lens being closer to the optical axis than another side of the first surface facing toward the subject;

a second surface which is a flat or curved surface, and which extends substantially perpendicular to the optical axis, wherein the first surface and the second surface of each of the plurality of projections are arranged such that an imaginary line extending perpendicularly to the second surface from an apex of the projection toward the lens intersects the first surface facing toward the second surface, and wherein the camera unit is configured to capture an image in front of the vehicle.

7. A method for producing a camera unit, the camera unit comprising a camera casing, a lens, and an image sensor that is disposed in interior of the camera casing, wherein:

a recess is formed in the camera casing on a side that is closer to a subject than is the lens;

at least a portion of the recess is formed by a first wall portion, which is exposed on an exterior side of the camera casing and faces toward an optical axis;

the first wall portion extends in parallel with the optical axis or is inclined so as to space away from the optical axis as the first wall portion extends from the lens toward the subject; and a plurality of projections are arranged on the first wall portion alongside one another in a direction of the optical axis;

each of the plurality of projections comprising:

a first surface, which is a flat or curved surface, one side of the first surface close to the lens being closer to the optical axis than another side of the first surface facing toward the subject;

a second surface which is a flat or curved surface, and which extends substantially perpendicular to the optical axis, wherein the first surface and the second surface of each of the plurality of projections are arranged such that an imaginary line extending perpendicularly to the second surface from an apex of the projection toward the lens intersects the first surface facing toward the second surface, the method comprising the step of:

setting angles of the first surface and the second surface to be equal to or greater than a draft angle.

* * * * *